(12) United States Patent
Sugihara et al.

(10) Patent No.: US 11,017,257 B2
(45) Date of Patent: May 25, 2021

(54) INFORMATION PROCESSING DEVICE, INFORMATION PROCESSING METHOD, AND PROGRAM

(71) Applicant: SONY CORPORATION, Tokyo (JP)

(72) Inventors: Kenji Sugihara, Kanagawa (JP); Tomohisa Tanaka, Tokyo (JP); Tsubasa Tsukahara, Tokyo (JP); Ryo Fukazawa, Kanagawa (JP); Akane Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 16/082,343

(22) PCT Filed: Feb. 8, 2017

(86) PCT No.: PCT/JP2017/004475
§ 371 (c)(1),
(2) Date: Sep. 5, 2018

(87) PCT Pub. No.: WO2017/187708
PCT Pub. Date: Nov. 2, 2017

(65) Prior Publication Data
US 2019/0026589 A1    Jan. 24, 2019

(30) Foreign Application Priority Data

Apr. 26, 2016    (JP) .............................. JP2016-088361

(51) Int. Cl.
*G06K 9/32*    (2006.01)
*G06K 9/00*    (2006.01)
(Continued)

(52) U.S. Cl.
CPC ........... *G06K 9/3241* (2013.01); *G06F 3/013* (2013.01); *G06F 3/04842* (2013.01);
(Continued)

(58) Field of Classification Search
None
See application file for complete search history.

(56) References Cited

U.S. PATENT DOCUMENTS

| 2011/0267374 | A1* | 11/2011 | Sakata | ..................... G06F 3/013 345/672 |
| 2012/0169723 | A1* | 7/2012 | Sakurai | ................ H04N 13/111 345/419 |

(Continued)

FOREIGN PATENT DOCUMENTS

| JP | 2002-082751 A | 3/2002 |
| JP | 2006-126936 A | 5/2006 |

(Continued)

*Primary Examiner* — Michelle Chin
(74) *Attorney, Agent, or Firm* — Paratus Law Group, PLLC

(57) ABSTRACT

There is provided an information processing device to realize an interaction with a user in a more preferred manner even in a situation in which an operation is selectively performed on a plurality of visibly presented targets, the information processing device including: a control unit configured to cause a predetermined output unit to display one or more pieces of display information; a detection unit configured to detect an operation for a visible object; and an identification unit configured to identify a candidate for display information serving as a target of the operation in accordance with a detection result of the operation. In a case in which there are a plurality of identified candidates, the control unit controls a display position of at least one candidate such that the plurality of candidates are separated from each other.

21 Claims, 22 Drawing Sheets

(51) Int. Cl.
*G06F 3/01* (2006.01)
*G06T 19/20* (2011.01)
*G06F 3/0484* (2013.01)
*G06F 3/147* (2006.01)
*G09G 3/00* (2006.01)
*G09G 5/38* (2006.01)

(52) U.S. Cl.
CPC ........... *G06F 3/147* (2013.01); *G06K 9/0061* (2013.01); *G06K 9/00228* (2013.01); *G06K 9/00671* (2013.01); *G06T 19/20* (2013.01); *G09G 3/001* (2013.01); *G09G 5/38* (2013.01); *G09G 2340/0464* (2013.01); *G09G 2340/14* (2013.01); *G09G 2354/00* (2013.01)

(56) References Cited

U.S. PATENT DOCUMENTS

| | | | |
|---|---|---|---|
| 2012/0229381 A1 | 9/2012 | Langridge | |
| 2014/0248950 A1* | 9/2014 | Tosas Bautista | G06F 1/1694 463/31 |
| 2016/0049013 A1 | 2/2016 | Tosas Bautista | |
| 2017/0180680 A1* | 6/2017 | Yu | H04N 5/23203 |

FOREIGN PATENT DOCUMENTS

| | | |
|---|---|---|
| JP | 2006-178842 A | 7/2006 |
| JP | 2007-233511 A | 9/2007 |
| JP | 2011-509480 A | 3/2011 |
| JP | 2011-175470 A | 9/2011 |
| JP | 2011-191811 A | 9/2011 |
| JP | 2012-022632 A | 2/2012 |
| JP | 2012-070081 A | 4/2012 |
| JP | 2012-217101 A | 11/2012 |
| JP | 2014-504413 A | 2/2014 |
| JP | 2014-086063 A | 5/2014 |
| JP | 2014-126997 A | 7/2014 |
| JP | 2014-142882 A | 8/2014 |
| JP | 2014-164572 A | 9/2014 |
| JP | 2015-503162 A | 1/2015 |
| JP | 2015-114757 A | 6/2015 |
| JP | 2016-018252 A | 2/2016 |
| JP | 2016-509705 A | 3/2016 |
| JP | 2016-218981 A | 12/2016 |
| JP | 2017-027206 A | 2/2017 |
| WO | WO 2009/016736 A1 | 2/2009 |
| WO | WO 2014/188565 A1 | 11/2014 |
| WO | WO 2014/207971 A1 | 12/2014 |
| WO | WO 2015/159550 A1 | 10/2015 |

\* cited by examiner

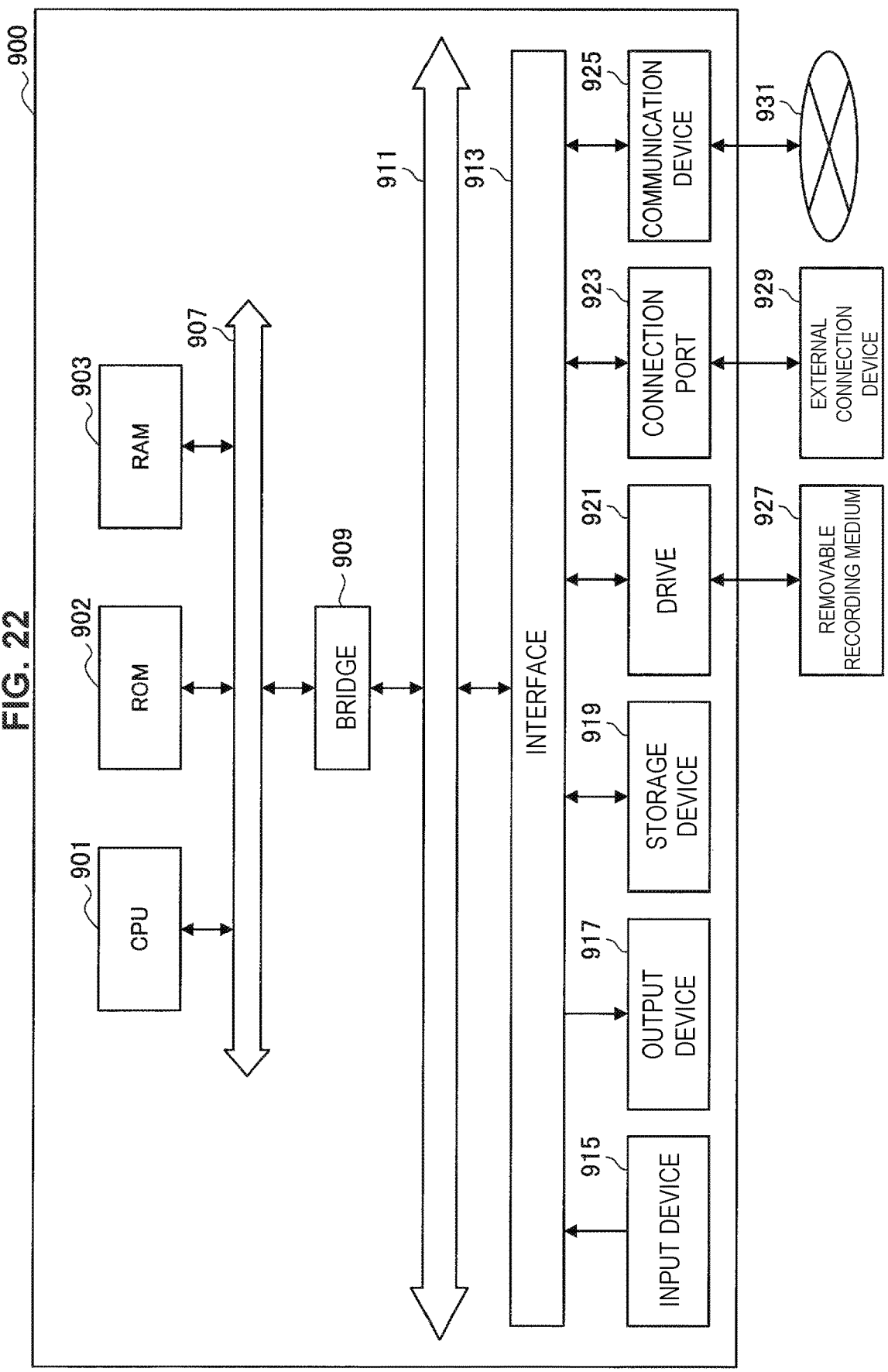

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2017/004475 (filed on Feb. 8, 2017) under 35 U.S.C. § 371, which claims priority to Japanese Patent Application No. 2016-088361 (filed on Apr. 26, 2016), which are all hereby incorporated by reference in their entirety.

TECHNICAL FIELD

The present disclosure relates to an information processing device, an information processing method, and a program.

BACKGROUND ART

There are various types of user interfaces (UIs) for operating a so-called information processing device (or an information processing system including the information processing device) such as a personal computer (PC), a smart phone, and a tablet terminal. In particular, in recent years, not only an input interface using a device such as a mouse or a touch panel but also various types of input interfaces using various analysis technologies or various recognition technologies have been proposed.

For example, Patent Literature 1 discloses an example of a technology of detecting the sight line of a user. By applying such a technology, for example, an interface for receiving a designation according to the sight line of a user for various types of visibly presented information, and realizing an interaction between the user and an information processing device has been also examined.

CITATION LIST

Patent Literature

Patent Literature 1: JP 2012-70081A

DISCLOSURE OF INVENTION

Technical Problem

On the other hand, it may be difficult for an information processing device to alternatively identify an operation target designated by a user through an input interface in a method of performing an operation on a visibly presented target in a situation in which an operation is selectively performed on a plurality of targets. In such a case, it may be difficult for the information processing device to accurately ascertain the intention of a user, and eventually it may be difficult to provide a service desired by the user.

In response to such a problem, the information processing device may try to identify a target designated by a user again by requesting a user of the same input in some cases. Nevertheless, even if the same input is performed again in the same situation as a previous input, the information processing device may not necessarily be able to alternatively identify an operation target designated based on the input, and an interaction with a user may be discontinuous due to a complicated operation in some cases.

Accordingly, in the present disclosure, an information processing device, an information processing method, and a program which can realize an interaction with a user in a more preferred manner even in a situation in which an operation is selectively performed on a plurality of visibly presented targets are presented.

Solution to Problem

According to the present disclosure, there is provided an information processing device including: a control unit configured to cause a predetermined output unit to display one or more pieces of display information; a detection unit configured to detect an operation for a visible object; and an identification unit configured to identify a candidate for display information serving as a target of the operation in accordance with a detection result of the operation. In a case in which there are a plurality of identified candidates, the control unit controls a display position of at least one candidate such that the plurality of candidates are separated from each other.

In addition, according to the present disclosure, there is provided an information processing method including: by a computer system, causing a predetermined output unit to display one or more pieces of display information; detecting an operation for a visible object; identifying a candidate for display information serving as a target of the operation in accordance with a detection result of the operation; and controlling, in a case in which there are a plurality of identified candidates, a display position of at least one candidate such that the plurality of candidates are separated from each other.

In addition, according to the present disclosure, there is provided a program which causes a computer system to cause a predetermined output unit to display one or more pieces of display information; detect an operation for a visible object; identify a candidate for display information serving as a target of the operation in accordance with a detection result of the operation; and control, in a case in which there are a plurality of identified candidates, a display position of at least one candidate such that the plurality of candidates are separated from each other.

Advantageous Effects of Invention

According to the present disclosure as described above, it is possible to provide an information processing device, an information processing method, and a program which can realize an interaction with a user in a more preferred manner even in a situation in which an operation is selectively performed on a plurality of visibly presented targets.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 22 is a functional block diagram which shows an example of a hardware configuration of an information processing device constituting the information processing system according to the embodiment.

MODE(S) FOR CARRYING OUT THE INVENTION

Figure 1:
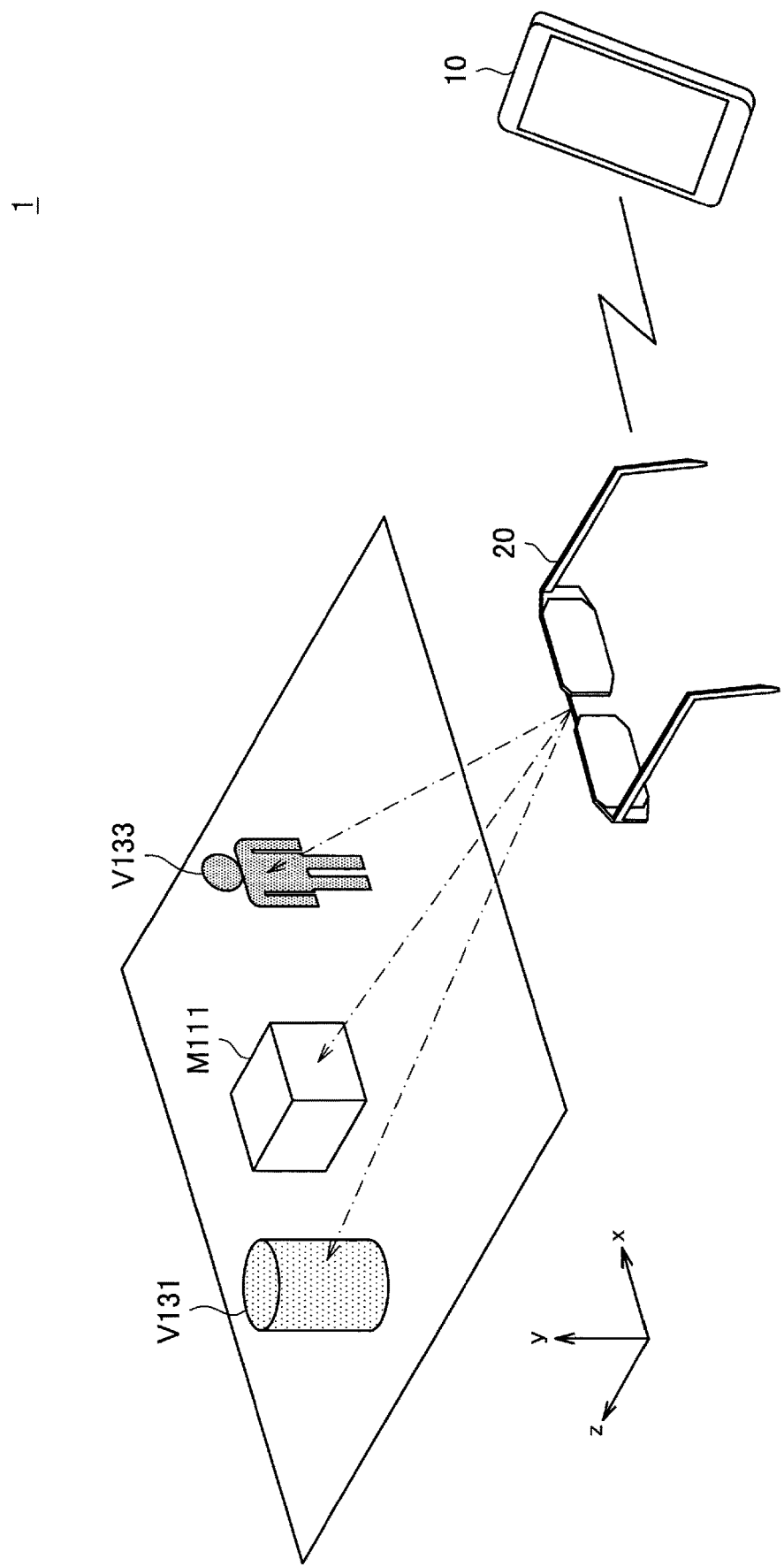
FIG. 1 is an explanatory diagram illustrating an example of an overall configuration of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Overview
1.1. Schematic configuration
1.2. Configuration of input/output device
1.3. Principle of self-position estimation
2. Examination on interaction
3. Technical feature
3.1. Basic principle
3.2. Functional configuration
3.3. Processing
4. Modification
4.1. Modification 1: example of display control in accordance with characteristics of display target
4.2. Modification 2: example of display control in accordance with characteristics of system
4.3. Modification 3: control example of position to which sight line is guided.
4.4. Modification 4: example of display control of display information other than candidate
4.5. Modification 5: example of control for guiding sight line
4.6. Modification 6: example of control in accordance with priority
4.7. Modification 7: example of control in accordance with state or situation
5. Application example
5.1. Application example 1: application example to smart phone or tablet terminal
5.2. Application example 2: application example to table top system
5.3. Application example 3: example of control in case of adopting touch operation
6. Hardware configuration
7. Conclusion

1. OVERVIEW OF SYSTEM

1.1. Overall Configuration of System

First, an example of an overall configuration of an information processing system according to an embodiment of the present disclosure will be described with reference to FIG. 1. In FIG. 1, a reference numeral M11 schematically shows an object (that is, a real object) positioned in a real space. In addition, reference numerals V131 and V135 schematically show virtual contents (that is, virtual objects) presented so as to be superimposed in the real space. That is, an information processing system 1 according to the present embodiment superimposes the virtual objects on objects in the real space such as a real object M111 based on a so-called AR technology, and presents a result to a user. Note that in order to make characteristics of the information processing system according to the present embodiment easier to understand, both real objects and virtual objects are presented together in FIG. 1.

As shown in FIG. 1, the information processing system 1 according to the present embodiment includes an information processing device 10, and an input/output device 20. The information processing device 10 and the input/output device 20 are configured to be able to transmit and receive information to and from each other via a predetermined network. Note that a type of network connecting the information processing device 10 and the input/output device 20 is not particularly limited. As a specific example, the network may be configured with a so-called wireless network such as a network based on the Wi-Fi (registered trademark) standard. In addition, as another example, the network may include the Internet, a dedicated line, a local area network (LAN), a wide area network (WAN), or the like. In addition, the network may include a plurality of networks or a part of the network may be configured as a wired network.

The input/output device 20 is a constituent for acquiring various types of input information or presenting various types of output information to a user holding the input/output device 20. In addition, the presentation of output information by the input/output device 20 is controlled by the information processing device 10 on the basis of input information acquired by the input/output device 20. For example, the input/output device 20 acquires information for recognizing the real object M111 (for example, a captured real space image) as input information, and outputs the acquired information to the information processing device 10. The information processing device 10 recognizes a position of the real object Mill in the real space on the basis of information acquired from the input/output device 20, and causes the input/output device 20 to present the virtual objects V131 and V135 on the basis of a result of the recognition. With such control, the input/output device 20 can present the virtual objects V131 and V135 to a user such that the virtual objects V131 and V135 are superimposed on the real object M111 based on the so-called AR technology.

In addition, the input/output device 20 is configured as a so-called head-mounted type device which is mounted on at least a part of the head by a user when used, and is configured to be able to detect a sight line of the user. On the basis of such a configuration, in a case in which, for example, it is recognized that a user gazes at a desired target (for example, the real object M111, the virtual objects V131 and V135, or the like) on the basis of a detection result of the sight line of the user by the input/output device 20, the information processing device 10 may identify the target as an operation target. In addition, the information processing device 10 may identify a target to which the sight line of a user is directed as an operation target with a predetermined operation with respect to the input/output device 20 as a trigger. In this manner, the information processing device 10 may provide a user with various types of services via the input/output device 20 by identifying an operation target and executing processing associated with the operation target.

Note that the input/output device 20 and the information processing device 10 are shown as different devices in FIG. 1, but the input/output device 20 and the information processing device 10 may be integrally configured. In addition, the configuration and processing of the input/output device 20 and the information processing device 10 will be separately described in detail below.

An example of a schematic configuration of the information processing system according to an embodiment of the present disclosure has been described above with reference to FIG. 1.

1.2. Configuration of Input/Output Device

Figure 2:
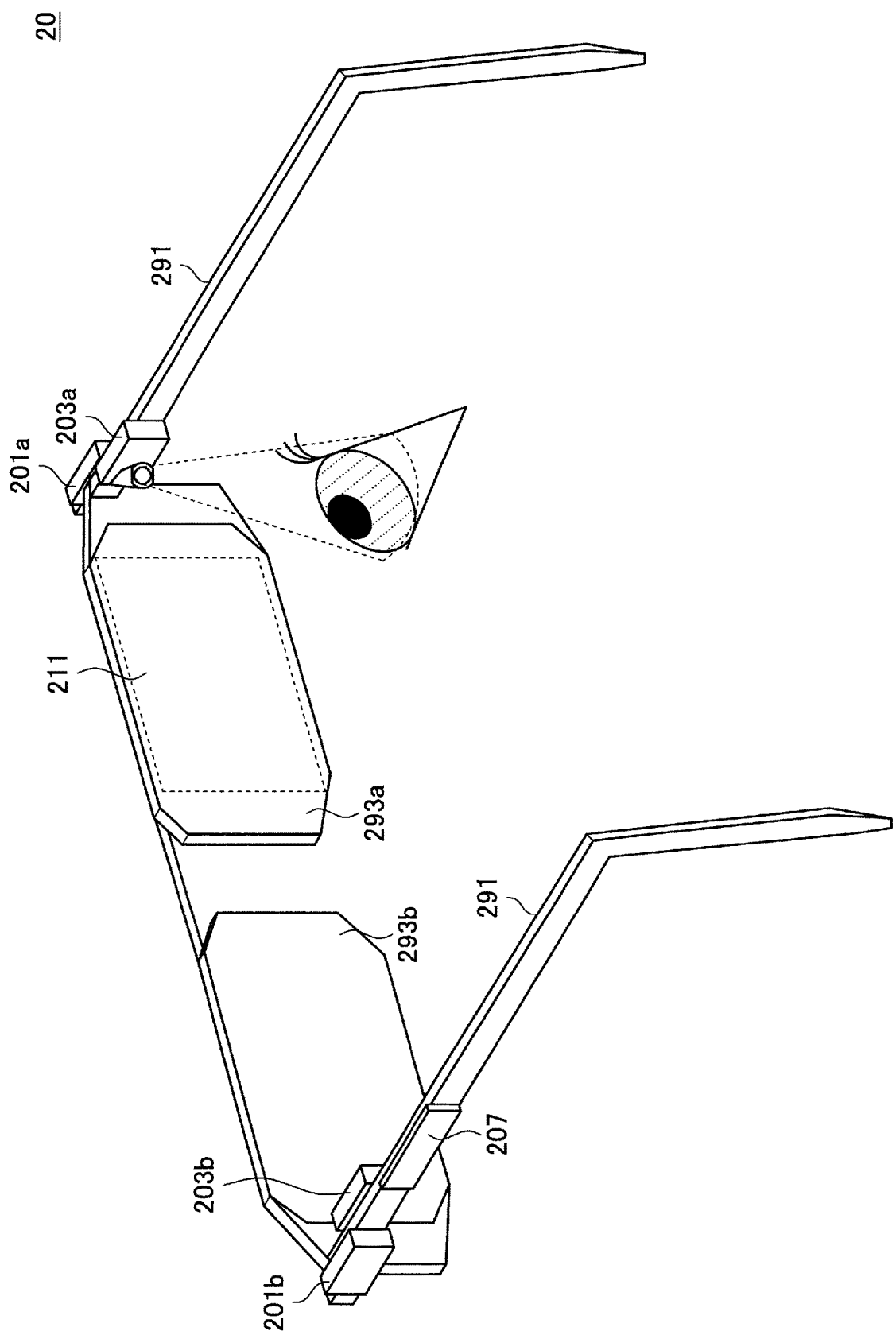
FIG. 2 is an explanatory diagram for describing an example of a schematic configuration of an input/output device according to the embodiment.

Next, an example of a schematic configuration of the input/output device 20 according to the present embodiment shown in FIG. 1 will be described with reference to FIG. 2. FIG. 2 is an explanatory diagram for describing an example of the schematic configuration of the input/output device according to the present embodiment.

As described above, the input/output device 20 according to the present embodiment is configured as a so-called head-mounted type device which is used by being mounted on at least a part of the head by a user. For example, in the example shown in FIG. 2, the input/output device 20 is configured as a so-called eyewear type (eyeglass type) device, and at least one of lenses 293a and 293b is configured as a transmission type display (output unit 211). In addition, the input/output device 20 includes first imaging units 201a and 201b, second imaging units 203a and 203b, an operation unit 207, and a holding portion 291 corresponding to a frame of eyeglasses. The holding portion 291 holds the output unit 211, the first imaging units 201a and 201b, the second imaging units 203a and 203b, and the operation unit 207 in a predetermined positional relationship with the head of the user when the input/output device 20 is mounted on the head of a user. In addition, although not shown in FIG. 2, the input/output device 20 may include a sound collecting unit for sound collection of the voice of a user.

Here, a more specific configuration of the input/output device 20 will be described. For example, in the example shown in FIG. 2, the lens 293a corresponds to a lens on a right eye side, and the lens 293b corresponds to a lens on a left eye side. That is, the holding portion 291 holds the output unit 211 such that the output unit 211 (in order words, the lenses 293a and 293b) is positioned in front of the eyes of a user in a case in which the input/output device 20 is mounted.

The first imaging units 201a and 201b are configured as a so-called stereo camera, and, when the input/output device 20 is mounted on the head of a user, each of the first imaging units is held by the holding portion 291 to face a direction in which the head of the user faces (that is, forward with respect to the user). At this time, the first imaging unit 201a is held in the vicinity of the right eye of a user, and the first imaging unit 201b is held in the vicinity of the left eye of the user. On the basis of such a configuration, the first imaging units 201a and 201b capture images of a subject positioned in front of the input/output device 20 (in order words, a real object positioned in the real space) from different positions. As a result, the input/output device 20 can acquire images of a subject positioned in front of a user, and calculates a distance from the input/output device 20 to the subject on the basis of a parallax between the images captured by the first imaging units 201a and 201b.

Note that as long as the distance between the input/output device 20 and a subject can be measured, a configuration or method of the input/output device is not particularly limited. As a specific example, the distance between the input/output device 20 and a subject may be measured on the basis of a method such as multi camera stereo, moving parallax, time of flight (TOF), and structured light. Here, TOF is a method of projecting light such as infrared rays on a subject and measuring a time until the projected light is reflected and returned by the subject for each pixel to obtain an image (a so-called distance image) including a distance (depth) to a subject on the basis of a result of the measurement. In addition, a structured light is a method of irradiating and imaging a pattern on a subject with light such as infrared rays to obtain a distance image including a distance (depth) to the subject on the basis of a change of the pattern obtained based on a result of the imaging. In addition, moving parallax is a method of measuring a distance to a subject on the basis of a parallax even with a so-called monocular camera. Specifically, a subject is imaged from different viewpoints by causing a camera to move and a distance to the subject is measured on the basis of a parallax between captured images. Note that it is possible to measure a distance to a subject more accurately by recognizing a movement distance and a movement direction of a camera using various types of sensors at this time. Note that a configuration of an imaging unit (for example, a monocular camera, a stereo camera, or the like) may be changed in accordance with a measurement method of the distance.

In addition, when the input/output device 20 is mounted on the head of a user, each of the second imaging units 203a and 203b is held by the holding portion 291 such that the eyeballs of the user are positioned within the imaging ranges. As a specific example, the second imaging unit 203a is held such that the right eye of a user is positioned within the imaging range. On the basis of such a configuration, it is possible to recognize a direction in which a sight line of the right eye faces on the basis of an image of the eyeball of the right eye captured by the second imaging unit 203a and a positional relationship between the second imaging unit 203a and the right eye. In the same manner, the second imaging unit 203b is held such that the left eye of the user is positioned within the imaging range. That is, it is possible to recognize a direction in which a sight line of the left eye faces on the basis of an image of the eyeball of the left eye captured by the second imaging unit 203b and a positional relationship between the second imaging unit 203b and the left eye. Note that in the example shown in FIG. 2, a configuration in which the input/output device 20 includes both of the second imaging units 203a and 203b is shown, but it is also possible to provide only one of the second imaging units 203a and 203b.

The operation unit 207 is a constituent for receiving an operation from a user with respect to the input/output device 20. The operation unit 207 may also be constituted as an input device such as a touch panel or a button, for example. The operation unit 207 is held at a predetermined position of the input/output device 20 by the holding portion 291. For example, in the example shown in FIG. 2, the operation unit 207 is held at a position corresponding to the temple of eyeglasses.

In addition, the input/output device 20 according to the present embodiment may include, for example, an acceleration sensor or an angular velocity sensor (gyro sensor), and may also be configured to be able to detect a motion of the head of a user wearing the input/output device 20 (in other words, a motion of the input/output device 20 itself). As a specific example, the input/output device 20 may recognize a change in at least one of the position and posture of the head of a user by detecting respective components of a yaw direction, a pitch direction, and a roll direction as a motion of the head of the user.

On the basis of the above configuration, the input/output device 20 according to the present embodiment can recognize a change in its own position or posture in the real space in accordance with a motion of the head of a user. In addition, at this time, the input/output device 20 can present virtual content (that is, a virtual object) to the output unit 211 such that the content is superimposed on a real object positioned in the real space on the basis of the so-called AR technology. Note that an example of a method for estimating the position and posture of the input/output device 20 in the real space (that is, self-position estimation) will be separately described in detail below.

Note that examples of an applicable head mounted type display device (head mounted display (HMD)) as the input/output device 20 includes, for example, a see-through type HMD, a video see-through type HMD, and a retinal projection type HMD.

A see-through HMD holds a virtual image optical system that includes transparent light-guiding units and the like in front of the eyes of a user using a half mirror or a transparent light-guiding plate and displays an image inside the virtual image optical system. Therefore, the user wearing the see-through HMD can include an external scene in a visual field even while the user watches the image displayed inside the virtual image optical system. With such a configuration, the see-through type HMD can cause an image of a virtual object to be superimposed on an optical image of a real object positioned in a real space in accordance with a recognition result of at least one of a position and a posture of the see-through type HMD on the basis of, for example, the AR technology. Note that a specific example of the see-through HMD includes a so-called glasses type wearable device in which a unit equivalent to lenses of glasses is configured as a virtual optical system. For example, the input/output device 20 shown in FIG. 2 corresponds to an example of the see-through type HMD.

The video see-through type HMD, in a case in which mounted on the head or face of a user, is mounted to cover the eyes of the user, and a display unit such as a display is held in front of the eyes of the user. In addition, the video see-through HMD includes an imaging unit that images a surrounding scene and causes the display unit to display an image of a scene in a front direction of the user imaged by the imaging unit. In this configuration, it is not difficult for the user wearing the video see-through HMD to directly include an external scene in a visual field, and the user can confirm the external scene in accordance with an image displayed on the display unit. In addition, at this time, the video see-through type HMD may cause a virtual object to be superimposed on an image of an external scene in accordance with a recognition result of at least one of the position and posture of the video see-through type HMD on the basis of, for example, the AR technology.

In a retina projection HMD, a projection unit is held in front of the eyes of a user and the image is projected from the projection unit to the eyes of the user so that the image is superimposed on the external scene. More specifically, in the retina projection HMD, an image is directly projected from the projection unit to the retinas of the eyes of the user so that the image is formed on the retinas. In this configuration, even in a case in which a user is shortsighted or far-sighted, the user can watch a clearer video. In addition, the user wearing the retina projection HMD can include an external scene in a visual field even while the user is watching the image projected from the projection unit. With such a configuration, the retinal projection type HMD can cause an image of a virtual object to be superimposed on an optical image of a real object positioned in a real space in accordance with a recognition result of at least one of a position and a posture of the retinal projection type HMD on the basis of, for example, the AR technology.

Note that for reference, an HMD called an immersive HMD in addition to the example described above is mentioned. Similarly to a video see-through type HMD, the immersive HMD is worn so that the eyes of the user are covered and a display unit such as a display is held in front of the eyes of the user. Therefore, it is difficult for the user wearing the immersive HMD to directly include an external scene (that is, a scene of the real world) in a visual field and only a video displayed on the display unit is included in a range of view. In this configuration, the immersive HMD can provide a sense of immersion to the user watching an image.

An example of the schematic configuration of the input/output device according to an embodiment of the present disclosure has been described above with reference to FIG. 2.

1.3. Principle of Self-Position Estimation

Next, an example of a principle of a method for estimating a position and a posture of the input/output device 20 in the real space (that is, self-position estimation) when the input/output device 20 causes a virtual object to be superimposed on a real object will be described.

As a specific example of the self-position estimation, the input/output device 20 captures an image of a marker with a known size or the like presented on a real object in the real space using an imaging unit such as a camera provided therein. Then, the input/output device 20 estimates at least one of the relative position and posture of itself with respect to the marker (and consequently, the real object on which the marker is presented) by analyzing the captured image. Note that in the following description, a case in which the input/output device 20 estimates its own position and posture is mainly described, but the input/output device 20 may estimate only one of its own position and posture.

Specifically, it is possible to estimate a relative direction of the imaging unit (and consequently, the input/output device 20 including the imaging unit) with respect to the marker in accordance with a direction of a marker captured in an image (for example, a direction of the pattern or the like of a marker). In addition, in a case in which the size of a marker is known, it is possible to estimate a distance between the marker and an imaging unit (that is, the input/output device 20 including the imaging unit) in accordance with the size of the marker in an image. More specifically, if an image of a marker is captured from a further distance, a smaller image of the marker will be captured. In addition, at this time, a range in the real space captured in an image can be estimated on the basis of a view angle of an imaging unit. It is possible to work backwards from the size of a marker captured in an image (in other words, a ratio occupied by the marker in a view angle) to calculate a distance between the marker and an imaging unit. With the above configuration, the input/output device 20 can estimate its own relative position and posture with respect to a marker.

In addition, a so-called simultaneous localization and mapping (SLAM) technology may also be used in self-position estimation of the input/output device 20. SLAM is a technology in which self-position estimation and environmental map creation are performed in parallel by using an imaging unit such as a camera, various sensors, an encoder, and the like. As a more specific example, in SLAM (in particular, visual SLAM), a three-dimensional shape of a captured scene (or a subject) is successively reconstructed on the basis of a moving image captured by an imaging unit. Then, creation of a surrounding environmental map and estimation of the position and posture of an imaging unit (and consequently, the input/output device 20) in the environment are performed by associating a reconstruction result of the captured scene with a detection result of the position and posture of the imaging unit. Note that, for example, various types of sensors such as an acceleration sensor or an angular velocity sensor are provided in the input/output device 20, and thereby it is possible to estimate the position and posture of an imaging unit as information indicating a relative change on the basis of a detection result of a corresponding sensor. Of course, as long as it is possible to estimate the position and posture of an imaging unit, the method is not necessarily limited to a method based on the detection result of various sensors such as an acceleration sensor or an angular velocity sensor.

With such a configuration, for example, based on a result of an imaging unit imaging a known marker, an estimation result of the relative position and posture of the input/output device 20 for the marker may be used for initialization processing or position correction in SLAM as described above. With such a configuration, the input/output device 20 can estimate its own position and posture with respect to a marker (and consequently, a real object presented by the marker) by self-position estimation based on SLAM having received results of initialization or position correction previously executed even in a situation in which a marker is not included in a view angle of an imaging unit.

As described above, an example of the principle of a method (that is, self-position estimation) for the input/output device 20 to estimate its own position and posture in the real space (that is, self-position estimation) when the input/output device 20 causes a virtual object to be superimposed on a real object has been described. Note that in the following description, for example, it is described that it is possible to estimate the position and posture of the input/output device 20 with respect to an object (a real object) in the real space on the basis of, for example, the principle described above.

2. EXAMINATION OF INTERACTION

Next, the problems of the information processing system according to the present embodiment will be summarized after an example of the interaction between an information processing system and a user, in particular, a case in which an operation is performed on a visibly presented target (for example, a real object, a virtual object, or the like), is mainly described.

Figure 3:
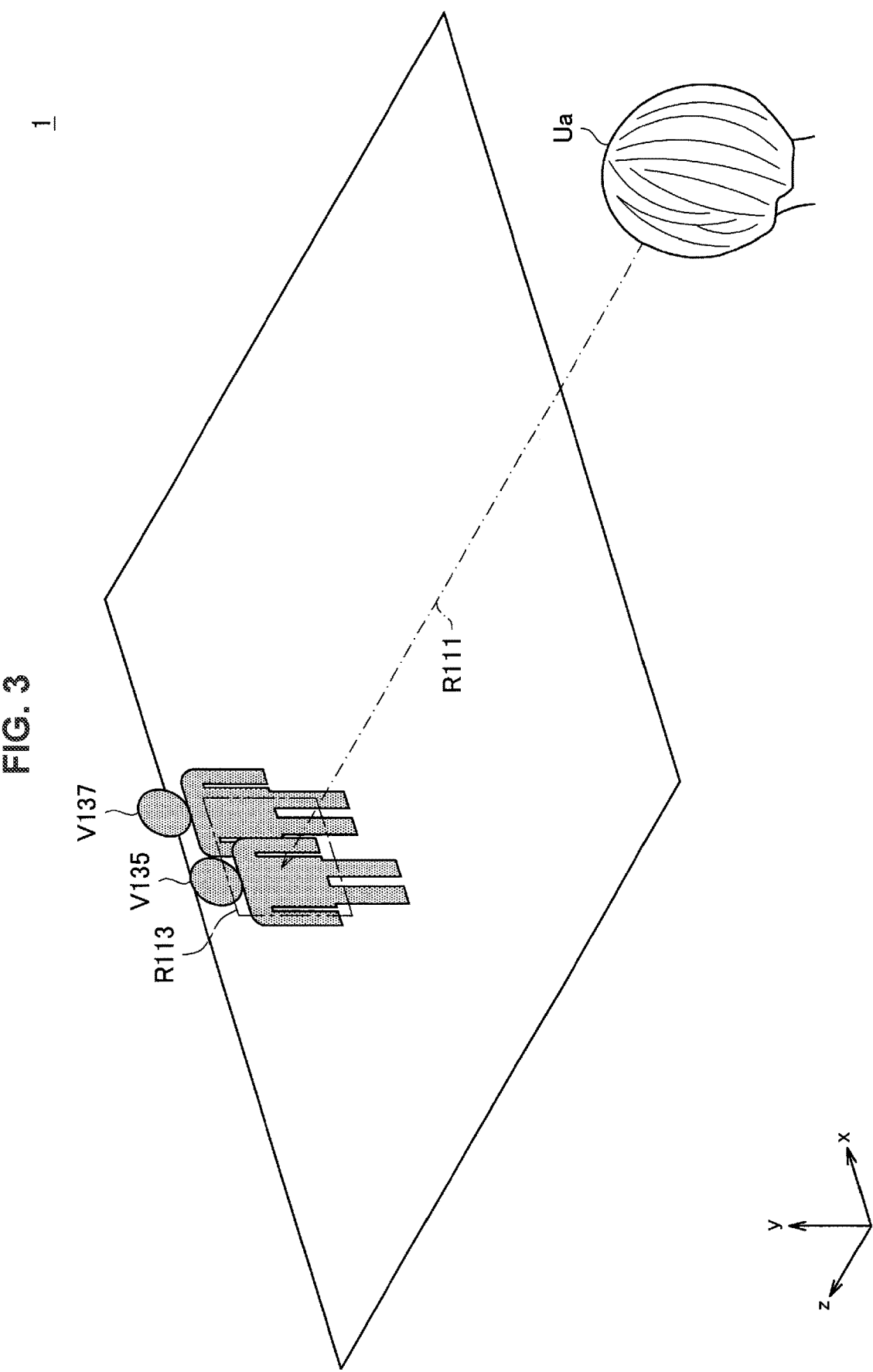
FIG. 3 is an explanatory diagram for describing an example of interaction between an information processing system and a user.

For example, FIG. 3 is an explanatory diagram for describing an example of the interaction between an information processing system and a user, and an example of a case in which a user designates a virtual object superimposed in the real space on the basis of the AR technology as an operation target using a sight line. In the example shown in FIG. 3, the plurality of virtual objects V135 and V137 are presented to be superimposed in the real space. Note that in FIG. 3, each virtual object is presented to be actually positioned in the real space to make the features of the information processing system according to the present embodiment easier to understand. Note that in FIG. 3, a reference numeral Ua schematically indicates the position of the head of a user (in other words, the position of a viewpoint), and a reference numeral R111 schematically indicates the sight line of the user. In addition, a reference numeral R113 schematically indicates an area in the real space to which the sight line R111 is directed to.

In the example shown in FIG. 3, the information processing system recognizes various objects positioned in the area R113 of the real space to which the sight line R111 is directed (for example, virtual objects) as a target of operation on the basis of, for example, a detection result of the sight line R111.

On the other hand, in the example shown in FIG. 3, the virtual objects V135 and V137 are presented to be positioned in the vicinity of each other, and a user directs the sight line R111 to positions on which the virtual objects V135 and V137 are superimposed. That is, the area R113 to which the sight line R111 is directed includes at least a portion of each of the virtual objects V135 and V137. For this reason, in the situation shown in FIG. 3, it may be difficult for the information processing system to alternatively identify a target designated by a user among the virtual objects V135 and V137 to which the sight line R111 is directed in some cases. In such cases, it is difficult to accurately ascertain an intention of a user in the information processing system. For this reason, for example, it may be difficult to provide a service without ascertaining the intention of a user in the information processing system in some cases. Moreover, as another example, a case in which a service different from the intention of a user is provided when the intention of the user is erroneously ascertained in the information processing system.

In response to such a problem, the identification of a target designated by a user may be tried again by asking the user for the same input in a case in which it is difficult for the information processing system to more accurately ascertain the intention of a user. However, even if the same input is performed in the same situation as a previous input, the information processing system may not be able to alternatively identify an operation target designated based on the input. In such a situation, it is assumed that a plurality of requests for a re-input to a user may be performed by the information processing system, and an operation may become complicated as a result. In addition, it can also be assumed that an interaction between an information processing system and a user may be discontinuous by continuously requesting the same input to a user a plurality of times.

In view of such a situation, the present disclosure proposes a mechanism for realizing an interaction with a user in a preferred manner by inducing the operation of the user in a situation in which an operation is selectively performed on a plurality of visibly presented targets.

3. TECHNICAL FEATURE

Hereinafter, technical features of the information processing system according to the present embodiment will be described.

3.1. Basic Principle

Figure 4:
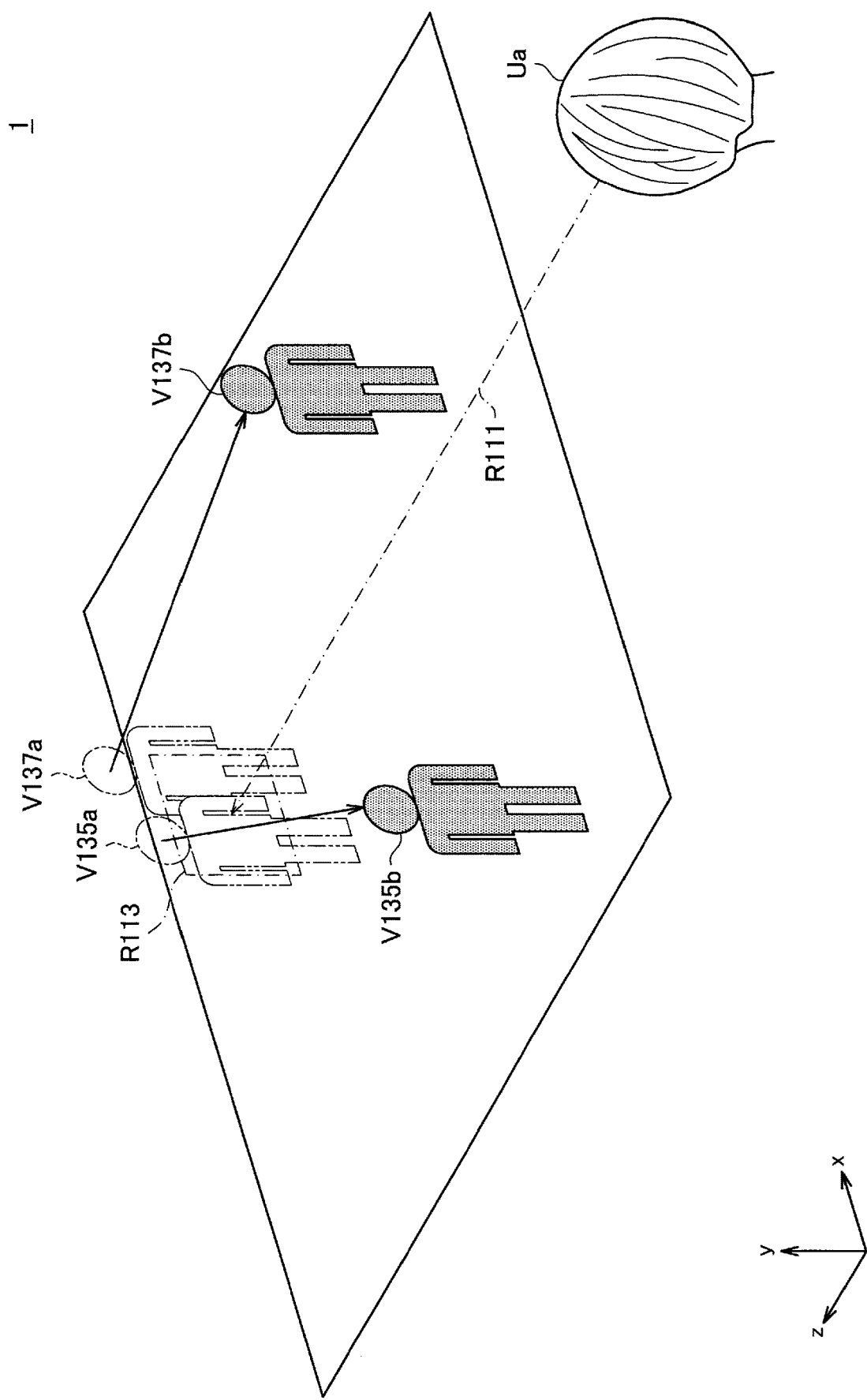
FIG. 4 is an explanatory diagram for describing a basic principle of an operation of the information processing system according to the embodiment.

First, a basic principle of a typical example of an operation for more accurately identifying a target designated by a user in a situation in which the information processing system 1 according to the present embodiment selectively performs an operation on a plurality of visibly presented targets will be described with reference to FIG. 4. FIG. 4 is an explanatory diagram for describing the basic principle of the operation of the information processing system according to the present embodiment. Note that in the example shown in FIG. 4, as in the example shown in FIG. 3, an example of a case in which a virtual object superimposed in the real space on the basis of the AR technology is designated as an operation target by a user with a sight line is shown.

The reference numeral Ua, R111, and R113 in FIG. 4 indicate targets given the same reference numerals as in FIG. 3. That is, FIG. 4 shows a situation in which a user directs the sight line R111 to positions on which the virtual objects V135 and V137 presented to be positioned in the vicinity of each other are superimposed as in the example shown in FIG. 3. Note that the reference numerals V135$a$ and V137$a$ schematically indicate respective positions in the real space on which the virtual objects V135 and V137 are superimposed at a timing at which a user directs the sight line. That is, at this timing, the information processing system 1 identifies the virtual objects V135 and V137 as candidates for virtual objects to be operated.

The information processing system 1 according to the present embodiment, as described above, in a case in which a plurality of candidates for virtual objects to be operated are identified, controls a display position of at least one of the candidates such that the plurality of identified candidates are separated from each other. For example, in the example shown in FIG. 4, the information processing system 1 controls display positions of the virtual objects V135 and V137 such that the virtual object V135 moves from a position V135$a$ to a position V135$b$, and the virtual object V137 moves from a position V137$a$ to a position V137$b$.

According to the control described above, in a case in which a user gazes at one of the virtual objects V135 and V137, the sight line R111 of the user is expected to be guided in accordance with a movement of a gazing target. As a specific example, in a case in which a user gazes at the virtual object V137, the sight line R111 of the user is expected to be guided from the position V137$a$ to the position V137$b$. That is, the information processing system 1 can identify a virtual object originally designated as an operation target by a user among the virtual objects V135 and V137 as a result of sight line guidance.

In addition, a distance which causes a plurality of target virtual objects to be separated from each other may be determined in accordance with resolving power (hereinafter, referred to as "sight line resolving power") for the information processing system 1 identifying a target on the basis of a result of detecting a sight line. Therefore, the sight line resolving power will be described in detail below.

The sight line resolving power can change in accordance with the accuracy of detecting a sight line by the information processing system 1. Specifically, as the accuracy of detecting the sight line R111 decreases, an error relating to the detection of the sight line R111 (in particular, the detection of a direction to which the sight line R111 is directed) becomes larger, and an area R113 in the real space (in order words, a corresponding area in an image in which the real space is captured) to which the sight line R111 may be directed becomes wider. For this reason, in a case in which the accuracy of detecting the sight line R111 is low, the resolving power (that is, a sight line resolving power) of a position in the real space directed by the sight line R111 tends to be lower. On the other hand, the error relating to the detection of the sight line R111 becomes smaller as the accuracy of detecting the sight line R111 increases, and thus the area R113 in the real space to which the sight line R111 may be directed becomes narrower. For this reason, in a case in which the accuracy of detecting the sight line R111 is high, the sight line resolving power tends to increase.

Figure 5:
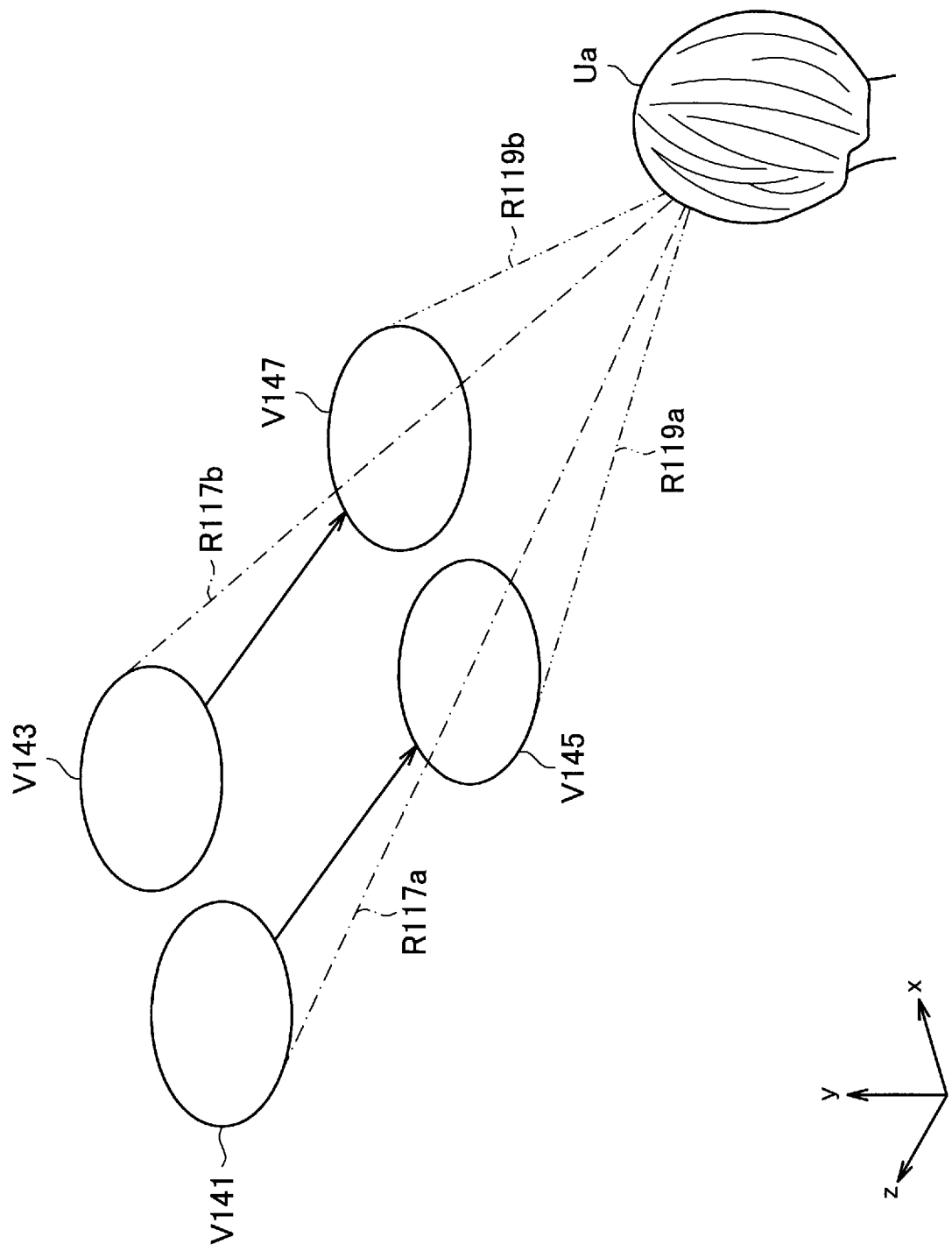
FIG. 5 is an explanatory diagram for describing sight line resolving power.

In addition, the sight line resolving power also varies with a distance between a view point and a target to which a sight line is directed. For example, FIG. 5 is an explanatory diagram for describing the sight line resolving power. In FIG. 5, each of reference numerals V141 to V147 indicates a virtual object presented to be superimposed in the real space. That is, in the example shown in FIG. 5, the virtual objects V145 and V147 are presented to be positioned closer to the viewpoint Ua than the virtual objects V141 and V143. Note that it is assumed that a distance between positions in the real space on which the virtual objects V141 and V143 are superimposed, respectively, is substantially equal to a distance between positions in the real space on which the virtual objects V145 and V147 are superimposed, respectively. Moreover, the reference numerals R117$a$ and R117$b$ schematically indicate viewing angles in a case in which both of the virtual objects V141 and V143 are referred to from the viewpoint Ua. In the same manner, reference numerals R119a and R119b schematically indicate viewpoint angles in a case in which both of the virtual objects V145 and V147 are referred to from the viewpoint Ua.

As shown in FIG. 5, the viewing angles in a case in which both the virtual objects V145 and V147 are referred to are wider than the viewing angles in a case in which both of the virtual objects V141 and V143 presented to be further separated from the viewpoint Ua are referred to. That is, in a case in which the virtual objects V145 and V147 are referred to from the viewpoint Ua, the virtual objects V145 and V147 are visually recognized by a user to be relatively further separated from than the virtual objects V141 and V143. For this reason, in a case in which a target positioned to be closer to a viewpoint is referred to, the sight line resolving power tends to be relatively higher than a case in which a target positioned to be farther from a viewpoint is referred to.

On the basis of such characteristics, the information processing system 1 may control, for example, the display positions of the virtual objects V135 and V137 such that the virtual objects V135 and V137 are separated from each other and are positioned to be closer to the viewpoint Ua as shown in FIG. 4.

As described above, a basic principle for a representative example of the operation of the information processing system 1 according to the present embodiment has been described with reference to FIGS. 4 and 5.

3.2. Functional Configuration

Figure 6:
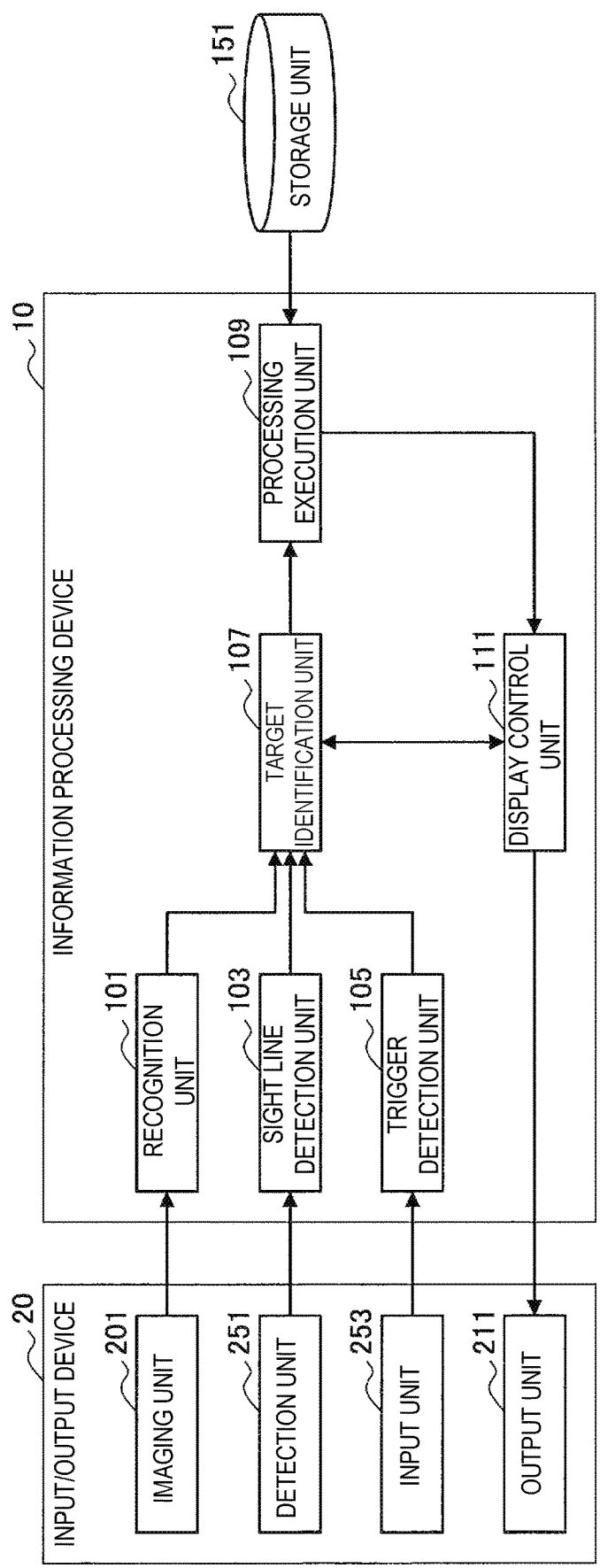
FIG. 6 is a block diagram illustrating an example of a functional configuration of the information processing system according to the embodiment.

Next, an example of a functional configuration of the information processing system 1 according to the embodiment will be described with reference to FIG. 6. FIG. 6 is a block diagram illustrating an example of the functional configuration of the information processing system 1 according to the embodiment.

As shown in FIG. 6, the information processing system 1 according to the present embodiment includes the input/output device 20, the information processing device 10, and a storage unit 151. Note that the input/output device 20 and the information processing device 10 shown in FIG. 6 correspond to the input/output device 20 and the information processing device 10 described with reference to FIG. 1.

First, a configuration of the input/output device 20 will be mainly described. As shown in FIG. 6, the input/output device 20 includes an imaging unit 201, a detection unit 251, an input unit 253, and an output unit 211. Note that the output unit 211 corresponds to the output unit 211 in FIG. 2.

The imaging unit 201 corresponds to the first imaging units 201a and 201b constituted as a stereo camera in FIG. 2. That is, the imaging unit 201 captures an image of an object (subject) in the real space, and outputs the captured image to the information processing device 10.

The detection unit 251 schematically indicates a constituent relating to acquisition of information for detecting a motion of the head of a user wearing the input/output device 20 or a direction in which the sight line of the user is directed (hereinafter, referred to as a "sight line direction"). Specifically, the detection unit 251 may include various types of sensors such as an acceleration sensor and an angular velocity sensor, and acquire a detection result of the sensor as information for detecting a change in the position or posture of the input/output device 20 (and consequently, a motion of the head of a user wearing the input/output device 20). In addition, the detection unit 251 may include the second imaging units 203a and 203b described with reference to FIG. 2, and acquire an image of the eyeball of a user captured by the imaging units as information for detecting the sight line of the user. Then, the detection unit 251 outputs the acquired information to the information processing device 10.

The input unit 253 is a constituent for acquiring information input from a user with respect to the input/output device 20. Specifically, the input unit 253 may include the operation unit 207 described with reference to FIG. 2. In addition, the input unit 253 includes a sound collecting unit for sound collection of the voice of a user, and the voice of a user input to the sound collecting unit may be acquired as information input from the user. Note that the example described above is merely an example, and, as long as a user can input information to the input/output device 20, the type of constituents (for example, an input device) included in the input unit 253 is not particularly limited. Then, the input unit 253 outputs the acquired information to the information processing device 10.

Next, the configuration of the information processing device 10 will be mainly described. As shown in FIG. 6, the information processing device 10 includes a recognition unit 101, a sight line detection unit 103, a trigger detection unit 105, a target identification unit 107, a processing execution unit 109, and a display control unit 111.

The recognition unit 101 acquires a captured image from the imaging unit 201 and performs analysis processing on the acquired image, thereby recognizing an object (subject) in the real space captured in the image. As a specific example, the recognition unit 101 acquires images captured from a plurality of different viewpoints (hereinafter, referred to as "stereo images") from the imaging unit 201 configured as a stereo camera, and measures a distance to the object captured in the image on the basis of a parallax between the acquired images for each pixel of the image. As a result, the recognition unit 101 can estimate or recognize a relative positional relationship in the real space (in particular, a positional relationship in a depth direction) between the imaging unit 201 (and consequently, the input/output device 20) and each object captured in the image at a timing at which the image is captured.

In addition, the recognition unit 101 may recognize a positional relationship in the real space between the input/output device 20 and an object captured in an image by performing self-position estimation and environmental map creation on the basis of SLAM. In this case, for example, the recognition unit 101 may acquire information indicating a change in the position or posture of the input/output device 20 from the detection unit 251, and use the information for the self-position estimation based on SLAM.

In this manner, the recognition unit 101 recognizes a position in the real space of each object captured in an image, and outputs information indicating a recognition result to the target identification unit 107.

The sight line detection unit 103 is a constituent for detecting a sight line of a user wearing the input/output device 20. Specifically, the sight line detection unit 103 acquires information indicating a detection result of a change in the position or posture of the input/output device 20 from the detection unit 251, and estimates a motion of the head of a user wearing the input/output device 20 (that is, the position or direction of the head) on the basis of the acquired information.

In addition, the sight line detection unit 103 acquires an image in which the eyeball of a user wearing the input/output device 20 is captured from the detection unit 251, and performs an image analysis on the acquired image, thereby recognizing a direction that the captured eyeball faces in the image. In this case, for example, the sight line detection unit 103 detects a direction that the eyeball faces in the real space, that is, a direction (hereinafter, referred to as "sight line direction") to which a sight light is directed, on the basis of a recognition result of the direction that the captured eyeball face in the image, and a positional relationship between an imaging unit which has captured the image and the eyeball. Note that it goes without saying that the positional relationship between an imaging unit that captures an image of eyeball and the eyeball can be recognized or estimated in advance on the basis of an assumed mounted state of the input/output device 20. In addition, a sight line direction detected at this time corresponds to a relative direction based on the position and posture of the input/output device 20 (and consequently, the position and posture of the head of a user wearing the input/output device 20).

Note that in the above description, an example in which the sight line of a user is estimated or detected on the basis of information acquired by the detection unit 251 of the input/output device 20 has been described. However, as long as the sight line of a user can be estimated or detected, the configuration or method is not necessarily limited to the above. As a specific example, the sight line detection unit 103 may estimate or detect the position or posture of the head of a user or the sight line of the user on the basis of an image of the head or eye of the user captured by an imaging unit provided as an external device different from the input/output device 20.

Then, the sight line detection unit 103 estimates (or detects) position and direction of the sight line of a user directed to the real space on the basis of an estimation result of the motion of the head of the user and a detection result of the sight line direction, and outputs information indicating the estimation result to the target identification unit 107.

The trigger detection unit 105 acquires information input from a user via the input unit 253 (hereinafter, referred to as "user input") from the input unit 253. Then, the trigger detection unit 105, in a case in which the acquired user input indicates a predetermined operation content, instructs the target identification unit 107 regarding an operation associated with the operation content using the user input as a trigger. As a specific example, the trigger detection unit 105, in a case in which the acquired user input indicates identification of a candidate to be operated described with reference to FIG. 4, instructs the target identification unit 107 to identify a candidate to be operated using the user input as a trigger.

As a specific example, in a case in which an operation has been performed on the operation unit 207 as shown in FIG. 2, the trigger detection unit 105 acquires control information indicating the operation content from the input unit 253 (that is, the operation unit 207). In this case, the trigger detection unit 105, in a case in which the acquired control information indicates an operation for identifying a candidate to be operated, instructs the target identification unit 107 to identify a candidate to be operated using the operation as a trigger. As a more specific example, the trigger detection unit 105, in a case in which the acquired control information indicates a touch operation with respect to a predetermined touch panel, may instruct the target identification unit 107 to identify a candidate to be operation using the touch operation as a trigger.

In addition, as another example, in a case in which an operation is performed by a voice input, the trigger detection unit 105 acquires an acoustic signal based on a sound collection result from the input unit 253 (that is, a sound collecting unit). In this case, the trigger detection unit 105 performs various types of analysis processing based on so-called voice recognition processing or natural language processing on the acquired acoustic signal, thereby recognizing content uttered by a user. Then, the trigger detection unit 105, in a case in which the content uttered by a user indicates an operation for identifying a candidate to be operated, instructs the target identification unit 107 to identify a candidate to be operated using a recognition result of the utterance content as a trigger.

Of course, the type of an operation serving as a trigger is not limited to the example described above. As a specific example, the trigger detection unit 105, in a case in which a user has executed a predetermined gesture, may set a detection of the gesture as the trigger. In this case, the trigger detection unit 105 may detect the gesture on the basis of a detection result of a change in a position or posture of a predetermined part by an acceleration sensor and the like provided in, for example, a wearable terminal and the like. In addition, the trigger detection unit 105 may detect the gesture executed by a user on the basis of a moving image of the user captured by an imaging unit provided outside.

In addition, as another example, the trigger detection unit 105 may use positional information of a user acquired by a global positioning system (GPS) and the like for detection of the trigger. As a specific example, the trigger detection unit 105, in a case in which it is recognized that the user has approached a predetermined position or in a case in which it is recognized that the user has passed a predetermined position, may use the recognition result as the trigger.

Moreover, as another example, the trigger detection unit 105 may recognize the movement of a user on the basis of an image in the real space captured by a predetermined imaging unit (for example, the imaging unit 201), and may use the recognition result for the detection of the trigger. As a specific example, the trigger detection unit 105, in a case in which it is recognized that a user has approached to a predetermined object in the real space (a real object) on the basis of an image captured by the imaging unit, may use the recognition result as the trigger. In addition, as another example, the trigger detection unit 105, in a case in which it is recognized that a user has passed a predetermined position (a point) in the real space on the basis of an image captured by the imaging unit, may use the recognition result as the trigger.

The target identification unit 107 acquires information indicating the recognition result of a position in the real space of each object (real object) captured in an image by the imaging unit 201 from the recognition unit 101. In addition, the target identification unit 107 acquires information indicating an estimation result of the position and direction of the sight line of a user directed to the real space from the sight line detection unit 103. Moreover, the target identification unit 107 acquires information indicating the display position of display information presented to a user via the output unit 211 (for example, a virtual object and the like presented to be superimposed in the real space) from a display control unit 111 to be described below.

Then, the target identification unit 107 recognizes a positional relationship among the viewpoint and sight line of a user, an object (real object) in the real space, and a position in the real space on which display information is superimposed on the basis of the various types of information acquired from each of the recognition unit 101, the sight line detection unit 103, and the display control unit 111.

Subsequently, the target identification unit 107, if an instruction relating to the identification of a candidate to be operated is received from the trigger detection unit 105, identifies a candidate for a target (for example, a real object or virtual object) to which the sight line is directed on the basis of the positional relationship among the viewpoint and sight line of a user, an object (real object) in the real space, and a position in the real space on which display information is superimposed. Note that, at this time, the target identification unit 107 may estimate an area in the real space to which a sight line is directed on the basis of the sight line resolving power in accordance with accuracy of detecting a sight line, and identify a target positioned in the area as a candidate for a target to which the sight line is directed.

In addition, the target identification unit 107 identifies a candidate for display information to be operated in accordance with a candidate for a target to which a sight line is directed. As a specific example, the target identification unit 107, in a case in which the sight line of a user is directed to display information of a virtual object, identifies the display information as a candidate for an operation target. In addition, as another example, the target identification unit 107, in a case in which the sight line of a user is directed to a real object, may identify display information associated with the real object (for example, display information and the like for operating the real object) as a candidate for an operation target. Note that the target identification unit 107, in a case in which display information is not associated with a real object to which the sight line of a user is directed) may exclude the real object from the candidate for a target to which a sight line is directed.

Then, the target identification unit 107, in a case in which the candidate for an operation target is alternatively identified, instructs a processing execution unit 109 to be described below to execute processing associated with the piece of candidate display information. On the other hand, the target identification unit 107, in a case in which it is difficult to limit the candidate for an operation target to one (that is, in a case in which there are a plurality of the candidates), instructs the display control unit 111 to control a display position of the piece of candidate display information.

The processing execution unit 109 is a constituent for executing various functions (for example, applications) provided by the information processing device 10 (and consequently, the information processing system 1). The processing execution unit 109, for example, may receive an instruction from the target identification unit 107, extract a corresponding application from a predetermined storage unit (for example, a storage unit 151 to be described below), and execute the extracted application. In addition, the processing execution unit 109 may output information indicating execution results of various applications to the display control unit 111.

The display control unit 111 presents the display information to a user by allowing the output unit 211 to output various types of display information serving as output targets.

Specifically, the display control unit 111 may allow the output unit 211 to output the virtual object to be superimposed in the real space on the basis of the AR technology. Note that in this case, the display control unit 111 may acquire information indicating the recognition result of a position in the real space of each object (real object) captured in an image by the imaging unit 201 from the recognition unit 101 or the target identification unit 107. As a result, the display control unit 111 can recognize a position of a real object in the real space, and control the display position of a virtual object such that the virtual object is superimposed at a desirable position in the real space on the basis of a result of the recognition.

In addition, the display control unit 111 outputs information indicating the display position of display information presented to a user via the output unit 211 to the target identification unit 107. As a result, the target identification unit 107 can estimate a position in the real space on which the display information is superimposed on the basis of the information.

Moreover, the display control unit 111 receives an instruction regarding control of the display position of each of a plurality of pieces of display information serving as candidates for an operation target from the target identification unit 107 in some cases. In this case, the display control unit 111 controls the display position of at least one of the plurality of pieces of display information such that the plurality of pieces of display information designated as candidates for an operation target from the target identification unit 107 are presented to be separated from each other. According to such control, the sight line of a user can be guided to a candidate to which the sight line is originally directed by the user as an operation target among the plurality of pieces of display information serving as the candidates for an operation target, and thus the target identification unit 107 can alternatively identify the candidate.

Moreover, the display control unit 111 acquires information indicating execution results of various applications from the processing execution unit 109 in some cases. In this case, the display control unit 111 may present the information to a user by allowing the output unit 211 to output the execution result of the application.

The storage unit 151 is a storage area for temporarily or permanently storing various types of data. For example, the storage unit 151 may store data for the information processing device 10 to execute various functions. As a more specific example, the storage unit 151 may also sore data for executing various applications (for example, library), management data and the like for managing various types of settings, and the like.

Note that the functional constituents of the information processing system 1 shown in FIG. 6 are merely examples, and the functional constituents of the information processing system 1 are not necessarily limited to only the examples shown in FIG. 6 as long as processing of each of the constituents described above can be realized. As a specific example, the input/output device 20 and the information processing device 10 may be configured to be integrated. In addition, as another example, the storage unit 151 may be included in the information processing device 10. In addition, as another example, some of respective constituents of the information processing device 10 may be provided outside (for example, a server and the like) the information processing device 10.

As described above, an example of the functional constituents of the information processing system 1 according to the present embodiment has been described with reference to FIG. 6.

3.3. Processing

Figure 7:
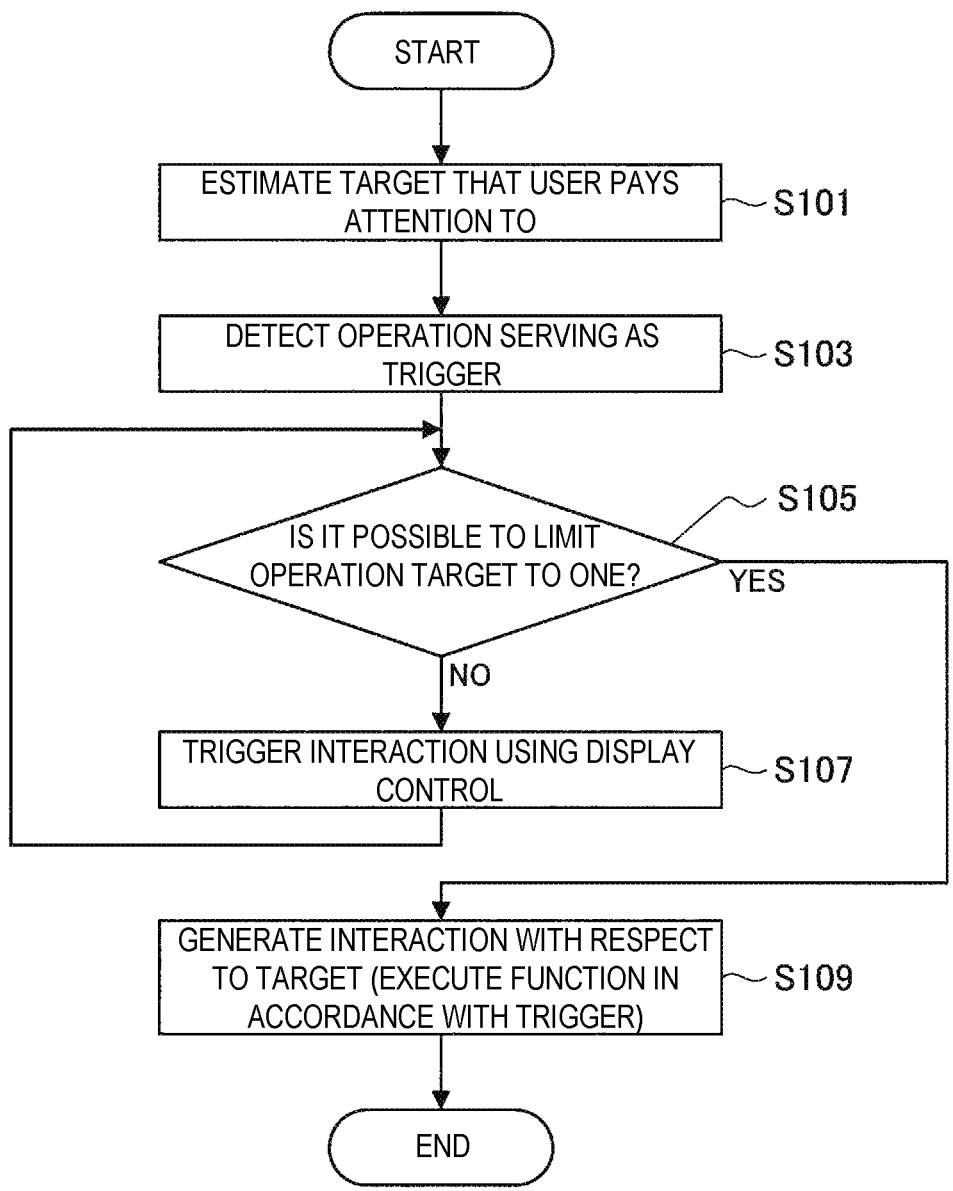
FIG. 7 is a flowchart which shows an example of the flow of a series of processing of the information processing system according to the embodiment.

Subsequently, an example of a flow of a series of processing of the information processing system 1 according to the present embodiment will be described focusing, in particular, on the processing of the information processing device 10 with reference to FIG. 7. FIG. 7 is a flowchart which shows an example of the flow of a series of processing of the information processing system according to the present embodiment.

As shown in FIG. 7, the information processing device 10 first identifies a target that a user pays attention to (S101). Specifically, the information processing device 10 (the recognition unit 101), on the basis of an image of the real space captured by the imaging unit 201 of the input/output device 20, recognizes an object (a real object) in the real space captured in the image. In addition, the information processing device 10 (the sight line detection unit 103) detects the sight line of a user wearing the input/output device 20 on the basis of various types of information acquired by the detection unit 251 of the input/output device 20. Note that a method of recognizing an object in the real space or a method of detecting the sight line of a user are already described, and thus detailed description thereof will be omitted. Then, the information processing device 10 recognizes the positional relationship among the viewpoint and sight line of the user, an object (real object) in the real space, and a position in the real space on which display information (for example, a virtual object) is superimposed on the basis of a recognition result of an object in the real space and a detection result of the sight line of the user. As a result, the information processing device 10 can identify a target (that is, a real object or virtual object) to which the sight line of a user is directed.

Next, the information processing device 10 (the target identification unit 107) identifies a candidate for a target to which the sight line of a user is directed at a timing at which a predetermined operation serving as a trigger is detected (S103). In addition, the information processing device 10 identifies a candidate for display information serving as an operation target in accordance with the candidate for a target to which the sight line is directed (S105).

Here, the information processing device 10, in a case in which it is difficult to limit the candidate for an operation target to one (NO in S105), triggers an interaction with a user off by controlling a display of at least one of a plurality of pieces of display information identified as the candidate (S107). Specifically, the information processing device 10 (the display control unit 111) controls the display position of at least one of a plurality of pieces of display information such that the plurality of pieces of display information identified as the candidate for an operation target are presented to be separated from each other. With such control, the information processing device 10 guides the sight line of a user to a candidate to which the user actually directs the sight line as an operation target (that is, a candidate designated by the user as an operation target), and identifies the candidate to which the sight line is guided as an operation target (S105).

Then, the information processing device 10, in a case in which it is possible to limit the candidate for an operation target to one (Yes in S105), causes an interaction with the operation target to be generated (S109). As a specific example, the information processing device 10 (the processing execution unit 109) may execute processing (for example, an application) associated with display information identified as an operation target.

As described above, an example of the flow of a series of processing of the information processing system 1 according to the present embodiment has been described focusing, in particular, on the processing of the information processing device 10 with reference to FIG. 7.

4. MODIFICATION

Subsequently, modification of the information processing system according to the present embodiment will be described.

4.1. Modification 1: Example of Display Control in Accordance with Characteristics of Display Target First, as a modification 1, an example of the display control of display information identified as the candidate for an operation target by the information processing system 1 will be described focusing, in particular, on control in accordance with the characteristics of the display information identified as the candidate for an operation target. The information processing system 1 according to the present embodiment guides the sight line of a user to display information actually designated as an operation target by the user by causing a plurality of pieces of display information identified as the candidates for an operation target to be separated from each other, thereby identifying the display information. For this reason, the information processing system 1 may control the characteristics of display information identified as the candidate for an operation target or a display position of the display information.

For example, the information processing system 1 may control a distance between a plurality of pieces of display information caused to be separated from each other in accordance with each size of the plurality of pieces of display information identified as the candidates for an operation target. As a specific example, the information processing system 1 may control a display position of the display information such that a plurality of pieces of display information are further separated from each other as each of the plurality of pieces of display information identified as the candidates for an operation target is larger.

In addition, as another example, the information processing system 1 may control a direction in which each of a plurality of pieces of display information is moved in accordance with a positional relationship between the plurality of pieces of display information identified as the candidates for an operation target. For example, the information processing system 1 may control a direction in which each of a plurality of pieces of display information is caused to be moved in consideration of a front-rear relationship or overlap of the plurality of pieces of identified display information.

In addition, the information processing system 1 may control a direction in which each of a plurality of pieces of display information is caused to be moved or a moved distance in accordance with a positional relationship between each of the plurality of pieces of display information identified as the candidates for an operation target and a view point (that is, a user). For example, the information processing system 1 may control a distance between a plurality of pieces of display information caused to be separated from each other in accordance with a distance between each of the plurality of pieces of identified display information and a viewpoint.

As described above, as the modification 1, an example of the display control of display information identified as the candidate for an operation target by the information processing system 1 has been described focusing, in particular, on control in accordance with the characteristics of the display information identified as the candidate for an operation target.

4.2. Modification 2: Example of Display Control in Accordance with Characteristics of System Subsequently, as a modification 2, an example of the display control of display information identified as the candidate for an operation target by the information processing system 1 will be described focusing, in particular, on control in accordance with the characteristics of respective devices constituting the information processing system 1.

For example, the information processing system 1 may control a distance between a plurality of pieces of display information caused to be separated from each other in accordance with sight line resolving power. Specifically, the information processing system 1 has the sight line resolving power tending to be lower as the accuracy of detecting a sight line is lower. For this reason, the information processing system 1 may control the display position of display information such that, for example, a plurality of pieces of display information identified as the candidates for an operation target are further separated from each other as the accuracy of detecting a sight line is lower.

In addition, as described above, the sight line resolving power tends to be relatively higher in a case in which a target positioned closer to a viewpoint is referred to than that in a case in which a target positioned farther from the viewpoint is referred to. For this reason, the information processing system 1 may control the display position of display information such that the plurality of pieces of display information identified as the candidates for an operation target are separated from each other and are positioned closer to a viewpoint (that is, a user) as the accuracy of detecting a sight line is lower.

As described above, as the modification 2, an example of the display control of display information identified as the candidate for an operation target by the information processing system 1 has been described focusing, in particular, on control in accordance with the characteristics of respective devices constituting the information processing system 1.

4.3. Modification 3: Control Example of Position to which Sight Line is Guided Next, as a modification 3, an example of a case of controlling a position to which a sight line is guided in accordance with a surrounding environment or situation will be described.

For example, the information processing system 1 may limit a position to which a sight line is guided in accordance with a detection result of a surrounding environment. As a specific example, the information processing system 1 may detect a position of backlight on the basis of an image captured by an imaging unit imaging the real space, and exclude the detected position from move destination of display information.

Moreover, as another example, the information processing system 1 may control the display position of display information such that the display information identified as the candidate for an operation target is moved to a position which a user selects more easily. For example, FIGS. 8 and 9 are explanatory diagrams for describing an overview of the information processing system according to the modification 3.

Figure 8:
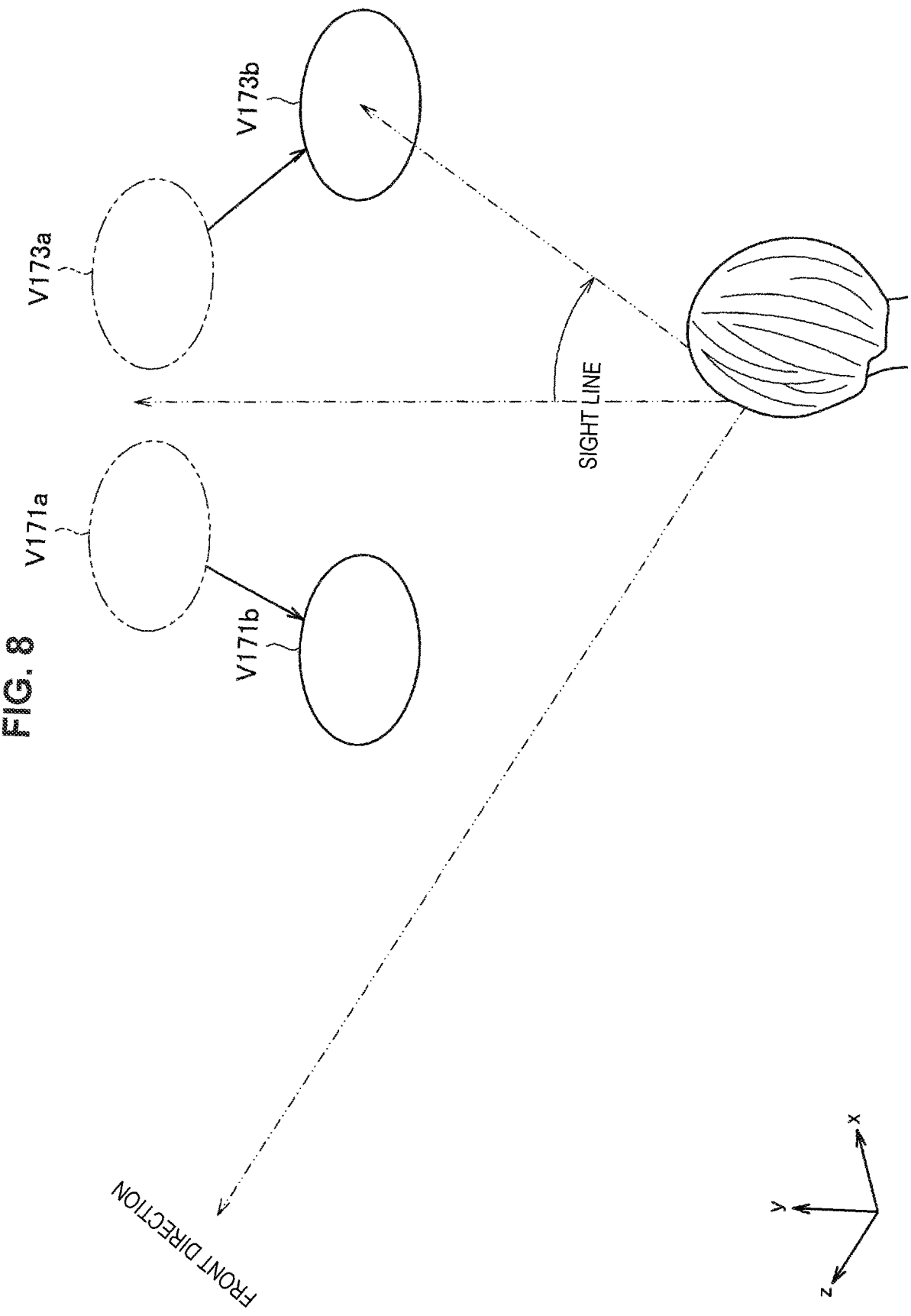
FIG. 8 is an explanatory diagram illustrating an overview of the information processing system according to Modification Example 3.

For example, FIG. 8 schematically shows a situation in which virtual objects V171 and V173 positioned in a direction different from a direction corresponding to a front surface of a user (that is, a direction in which the head faces and which is, hereinafter, referred to as a "front direction") are gazed at by the user by shifting the sight line from the front direction to a transverse direction. In such a situation, in the example shown in FIG. 8, the information processing system 1 causes the virtual objects V171 and V173 to be separated from each other by simply moving the virtual objects V171 and V173 to which the sight line is directed to the left or right. Note that reference numerals V171a and V173a schematically indicate respective position in the real space on which the virtual objects V171 and V173 are superimposed at a timing at which the user directs the sight line to the virtual objects V171 and V173. In addition, reference numerals V171b and V173b schematically indicate respective positions in the real space on which the virtual objects V171 and V173 are superimposed after control of the display positions.

As seen by referring to FIG. 8, in a case in which the virtual objects V171 and V173 are simply caused to be separated from each other by being moved to the left or right, the virtual object V173 which is positioned in a direction farther from the front direction is moved to a position further away from the front direction. For this reason, in the example shown in FIG. 8, a user needs an operation for causing the sight line to be moved further outward, such as shaking the head, to select the virtual objects V173 in accordance with the control of the display positions of the virtual objects V171 and V173, and the load of the user caused by sight line movement tends to be increased.

Figure 9:
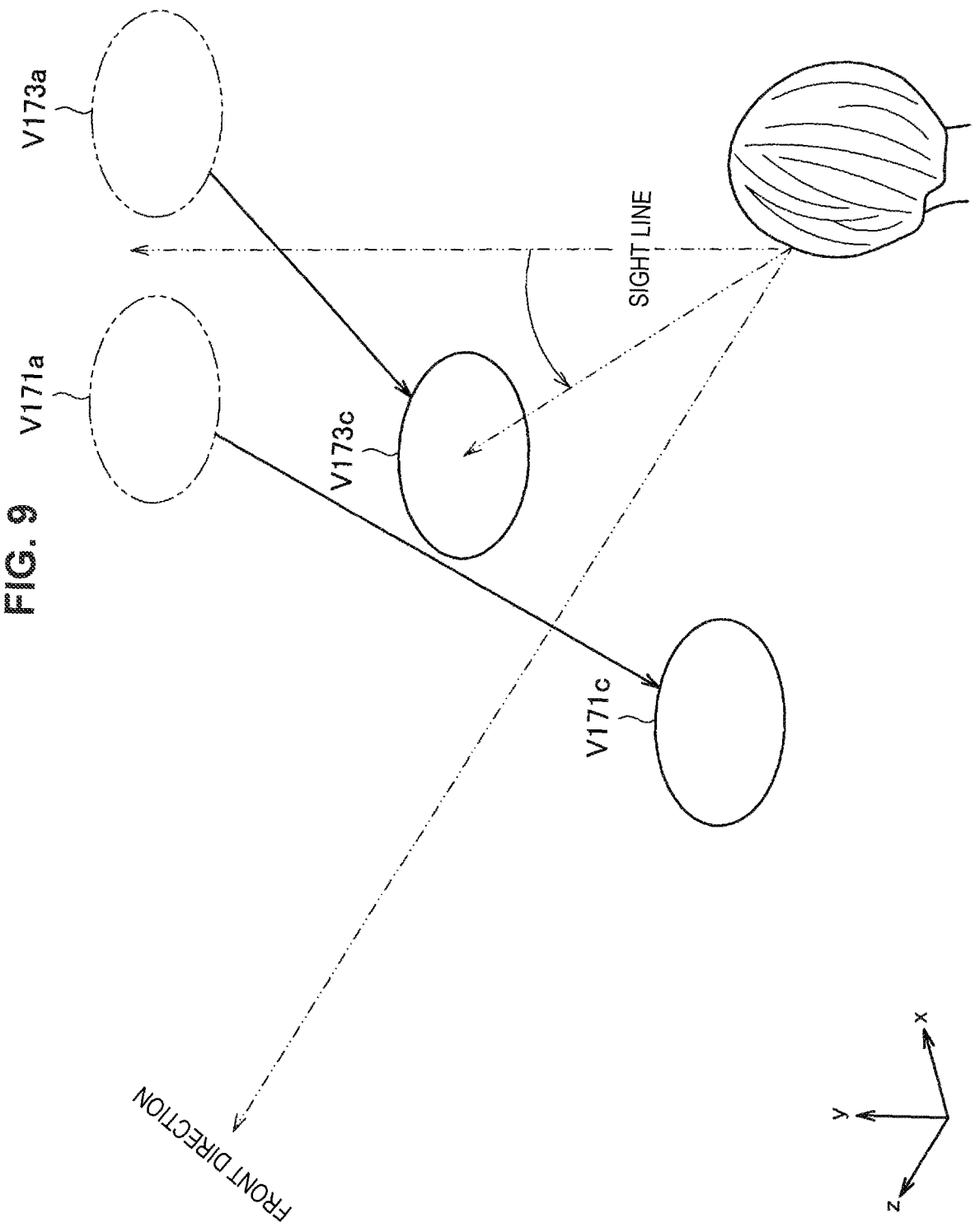
FIG. 9 is an explanatory diagram illustrating an overview of the information processing system according to Modification Example 3.

On the other hand, in the example shown in FIG. 9, the information processing system 1 causes the virtual objects V171 and V173 to which a sight line is directed in the same situation as the example shown in FIG. 8 to be moved such that they are positioned in a front direction of a user and are separated from each other to the left or right. Note that the reference numerals V171a and V173a in FIG. 9 are the same as the reference numerals V171a and V173a in FIG. 8. In addition, the reference numerals V171c and V173c schematically indicate respective positions in the real space on which the virtual objects V171 and V173 are superimposed after the control of the display positions.

As shown in FIG. 9, by controlling the display positions of the virtual objects V171 and V173, for example, even if a user selects the virtual objects V173, it is possible to select the virtual object V173 by returning the shifted sight line to the front direction. As described above, as seen by a comparison between FIG. 8 and FIG. 9, a display position of a plurality of pieces of display information are controlled such that the plurality of pieces of display information identified as the candidates for an operation target are positioned in front of a user, and thereby it is possible to reduce the load of a user related to a selection of the display information (that is, the load to a user due to the sight line movement).

Moreover, as another example, since a human's field of view generally tends to be wide transversely, the sight line resolving power is higher in a longitudinal direction than in a transverse direction in some cases. In view of such a situation, the information processing system 1 may control display position of display information such that a plurality of pieces of display information identified as the candidates for a operation target are separated from each other in a vertical direction.

As described above, as modification 3, an example of a case of controlling a position to which a sight line is guided in accordance with a surrounding environment or situation will be described.

4.4. Modification 4: Example of Display Control of Display Information Other than Candidate Subsequently, as a modification 4, an example of a case of controlling a display of other pieces of display information different from display information identified as the candidate for an operation target will be described.

Figure 10:
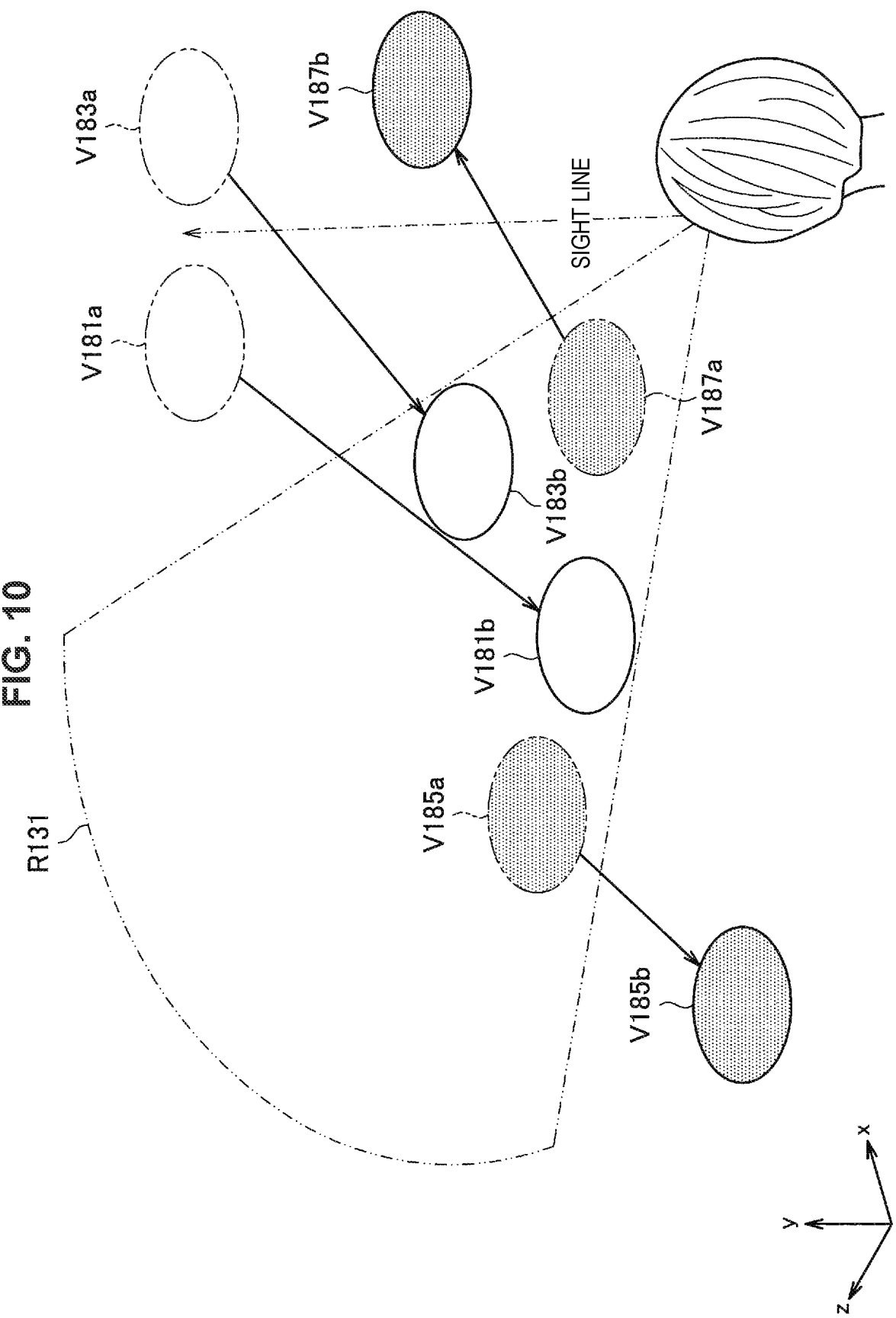
FIG. 10 is an explanatory diagram illustrating an overview of the information processing system according to Modification Example 4.

For example, FIG. 10 is an explanatory diagram for describing an overview of an information processing system according to the modification 4. FIG. 10 schematically shows a situation in which a user gazes at virtual objects V181 and V183 positioned in a different direction from a front direction by shifting the sight line from the front direction to a transverse direction. In FIG. 10, the reference numeral R131 schematically indicates an area showing the view of a user in a case in which the user faces the front direction. That is, in the example shown in FIG. 10, the information processing system 1 causes the virtual objects V181 and V183 to which a sight line is directed to be moved such that they are positioned in an area R131 indicating a field of view of a case in which a user faces a front direction, and are separated from each other to the left or right. Note that reference numerals V181a and V183a schematically indicate respective positions in the real space on which virtual objects V181 and V183 are superimposed at a timing at which a user directs the sight line to the virtual objects V181 and V183. In addition, reference numerals V181b and V183b schematically indicate respective positions in the real space on which the virtual objects V181 and V183 are superimposed after control of the display positions.

On the other hand, in the example shown in FIG. 10, at a timing at which a user directs the sight line to the virtual objects V181 and V183, virtual objects V185 and V187 are positioned in the area R131. Note that reference numerals V185a and V187a schematically indicate respective positions in the real space on which the virtual objects V185 and V187 are superimposed at a timing at which a user directs the sight line to the virtual objects V181 and V183. In such a situation, even if the virtual objects V181 and V183 identified as the candidates for an operation target are caused to be moved into the area R131, the virtual objects V181 and V183 are covered by the virtual objects V185 and V187 in some cases.

In view of such a situation, the information processing system 1, in a case in which another piece of display information different from a piece of display information identified as the candidate for an operation target is positioned at a movement destination of the candidate, the another piece of display information may be caused to be moved to a position different from the candidate. For example, in the example shown in FIG. 10, the information processing system 1 causes the virtual object V185 positioned in the area R131 to be moved to a position V185b outside the area R131, and causes the virtual object V187 to be moved to a position V187b outside the area R131. With such control, when the sight line of a user is guided to a candidate to which the user originally directs the sight line as an operation target, occurrence of a situation in which selection of the candidate is hindered by the candidate being covered by another piece of display information can be prevented.

Figure 11:
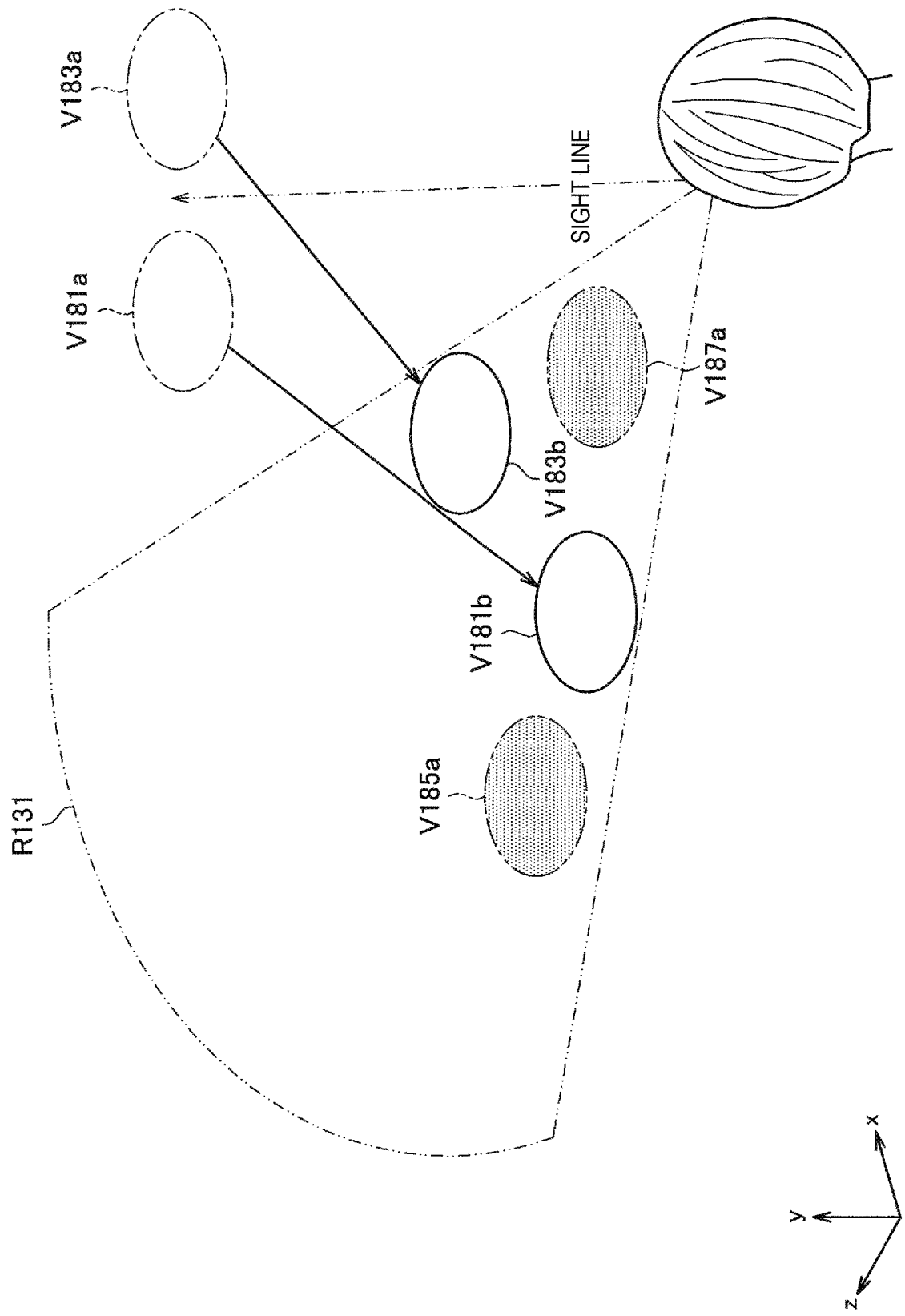
FIG. 11 is an explanatory diagram for describing another aspect of the information processing system according to a modification 4.

In addition, as another example, the information processing system 1, in a case in which another piece of display information different from a piece of display information identified as the candidate for an operation target is positioned at the movement destination of the candidate, may control such that the another piece of display information is temporarily non-displayed. For example, FIG. 11 is an explanatory diagram for describing another aspect of the information processing system according to modification 4. Note that in FIG. 11, the same reference numerals are given to the same objects as in FIG. 10.

That is, in the example shown in FIG. 11, in the same manner as the example shown in FIG. 10, the information processing system 1 causes the virtual objects V181 and V183 to which the sight line is directed to be moved such that they are positioned in the area R131 indicating a view in a case in which a user faces the front direction, and are separated from each other to the left or right. On the other hand, in the example shown in FIG. 11, the information processing system 1 controls a display of the virtual objects V185 and V187 such that the virtual objects V185 and V187 positioned in the area R131 are temporarily non-displayed. With such control, in the same manner as the example shown in FIG. 10, when the sight line of a user is guided to a candidate to which the user originally directs the sight line as an operation target, the occurrence of a situation in which the selection of the candidate is hindered by the candidate being covered by another piece of display information can be prevented.

As described above, an example of a case in which a display of another piece of display information different from a piece of display information identified as the candidate for an operation target is controlled has been described as modification 4.

4.5. Modification 5: Example of Control for Guiding Sight Line

Subsequently, an example of control for guiding the sight line of a user in a more preferred manner will be described as a modification 5.

For example, in a situation in which a user directs the sight line toward a moving target, the sight line may be moved by predicting a motion of the target in some cases. For this reason, for example, in a case in which the display position of display information is controlled, it is possible to guide the sight line of a user in a more natural manner by moving the display information in accordance with the motion expected by a user in some cases.

As a specific example, the information processing system 1 may control the motion of display information in accordance with attributes of the display information. More specifically, the information processing system 1, in a case in which a target virtual object imitates a character that flies in the sky like a bird, may cause operation to be performed such that, for example, the virtual object flies. In addition, as another example, the information processing system 1, in a case in which a target virtual object imitates a character that does not fly in the sky such as a dog, may cause operation to be performed such that, for example, the virtual object moves in a plane.

In addition, as another example, the information processing system 1 may control the motion of display information according to physical restrictions.

Figure 12:
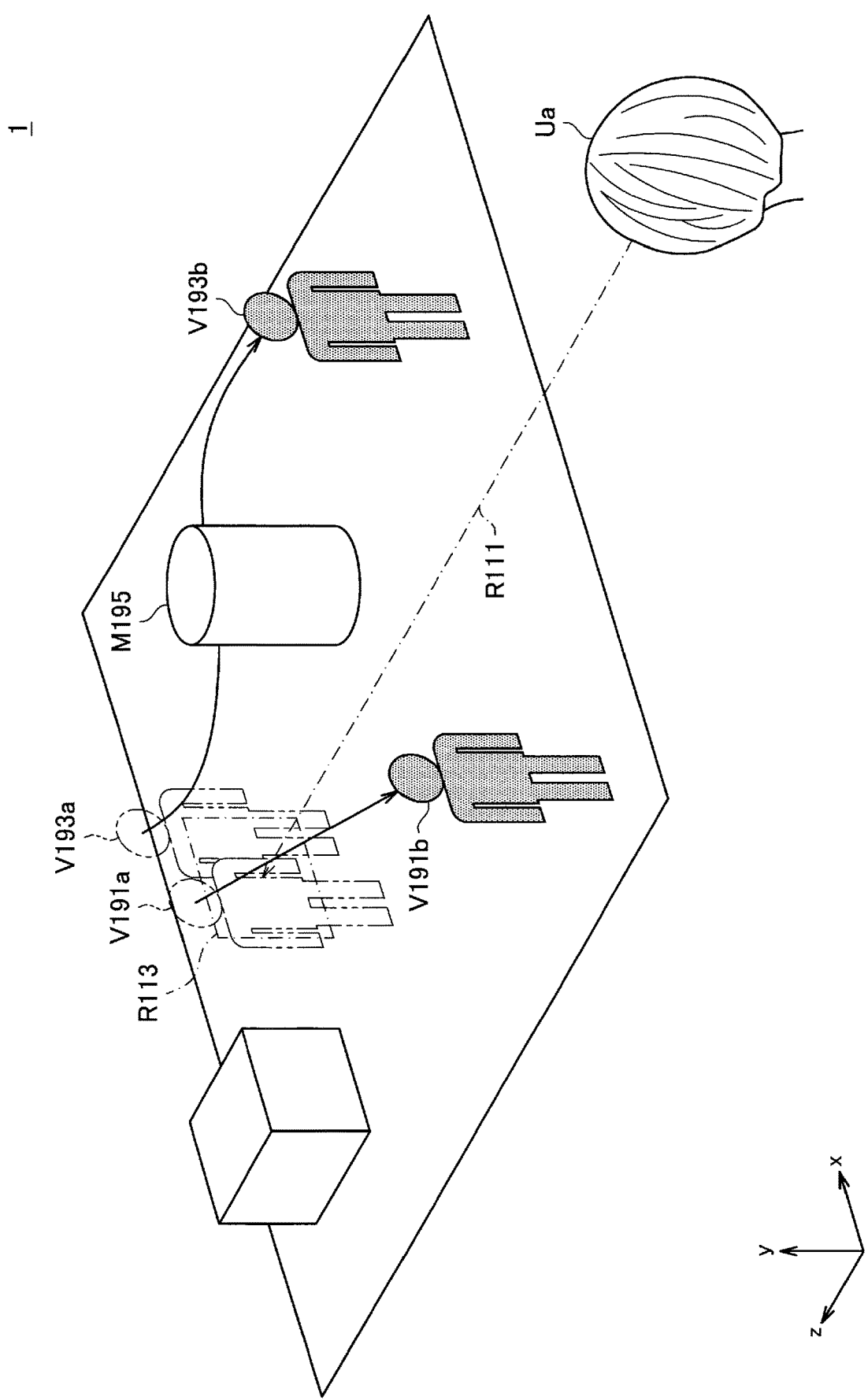
FIG. 12 is an explanatory diagram illustrating an overview of the information processing system according to Modification Example 5.

For example, FIG. 12 is an explanatory diagram for describing an overview of the information processing system according to the modification 5, and shows an example of a case of controlling the motion of display information according to physical restrictions. Note that in FIG. 12, the reference numerals Ua, R111, and R113 indicate respective targets to which the same reference numerals as in FIGS. 3 and 4 are given. That is, in the example shown in FIG. 12, the information processing system 1 controls the display positions of virtual objects V191 and V193 such that the virtual objects V191 and V193 to which the sight line R111 of a user is directed are separated from each other. Specifically, the information processing system 1 causes the virtual object V191 to be moved from a position V191a to a position V191b, and causes the virtual object V193 to be moved from a position V193a to a position V193b.

On the other hand, in the example shown in FIG. 12, a real object M195 is interposed between the position V193a and the position V193b. For this reason, in the example shown in FIG. 12, the information processing system 1 controls the motion of the virtual object V193 such that the virtual object V193 positioned at the position V193a to be moved to the position V193b by avoiding the real object M195.

With such control, the motion of display information is more likely to substantially coincide with the motion expected by a user, and eventually, it is possible to guide the sight line of a user in a more natural manner.

In addition, in a case in which the candidate for a target is identified as a moving object and a non-moving object, the information processing system 1 may guide the sight line of a user by moving the moving object.

Figure 13:
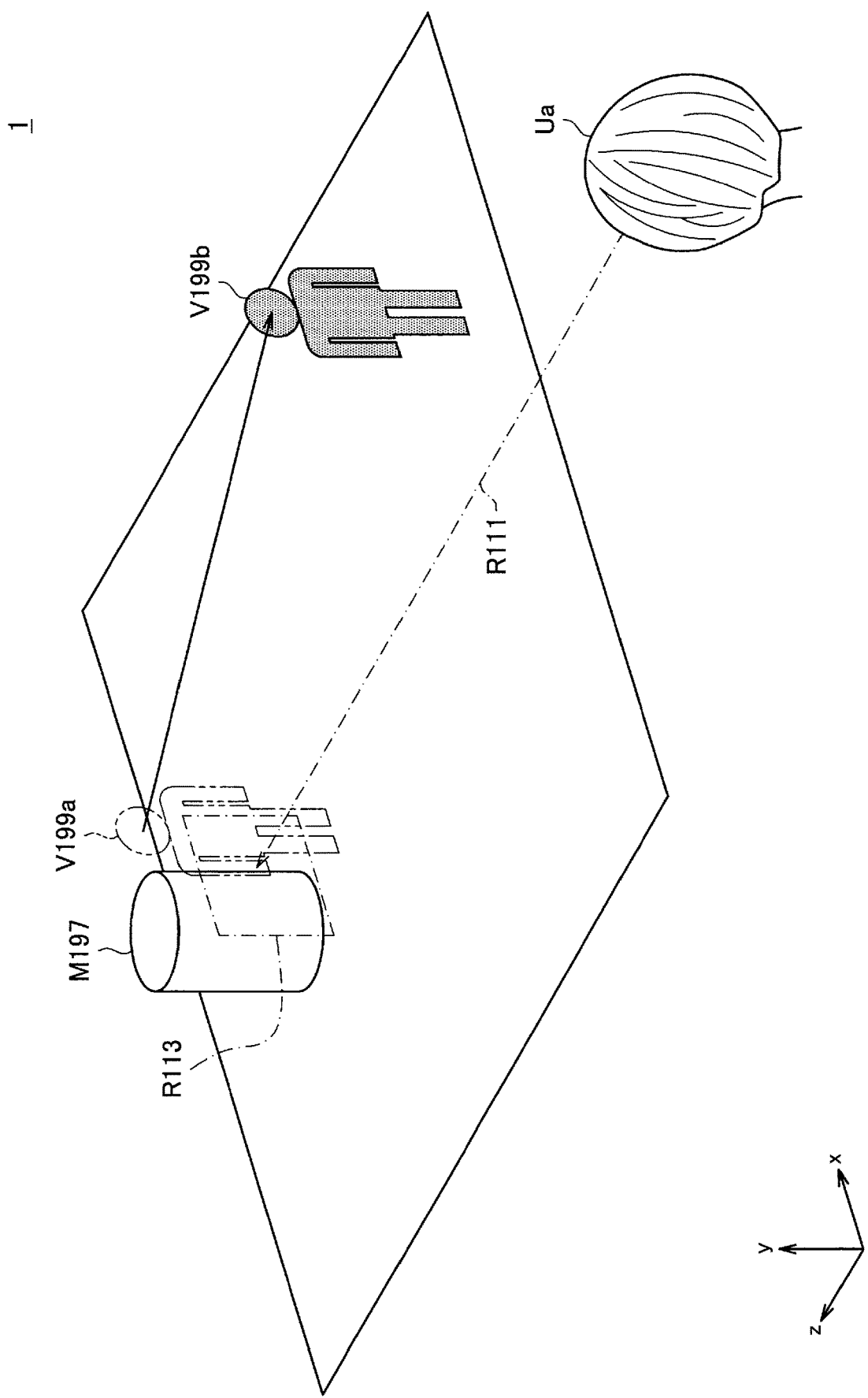
FIG. 13 is an explanatory diagram for describing another aspect of the information processing system according to a modification 5.

For example, FIG. 13 is an explanatory diagram for describing another aspect of the information processing system according to the modification 5. In FIG. 13, the reference numerals Ua, R111, and R113 indicate respective targets to which the same reference numerals as in FIG. 12 are given. Specifically, FIG. 13 shows a situation in which the sight line R111 of a user is directed to a real object M197 and a virtual object V199 superimposed in the vicinity of the real object M197. Note that in FIG. 13, the real object M197 corresponds to a "non-moving object", and the virtual object V199 corresponds to a "moving object". For this reason, in the example shown in FIG. 13, the information processing system 1 causes the moveable virtual object V199 side to be moved from the position V199a to the position V199b such that the real object M197 and the virtual object V199 are separated from each other.

Figure 14:
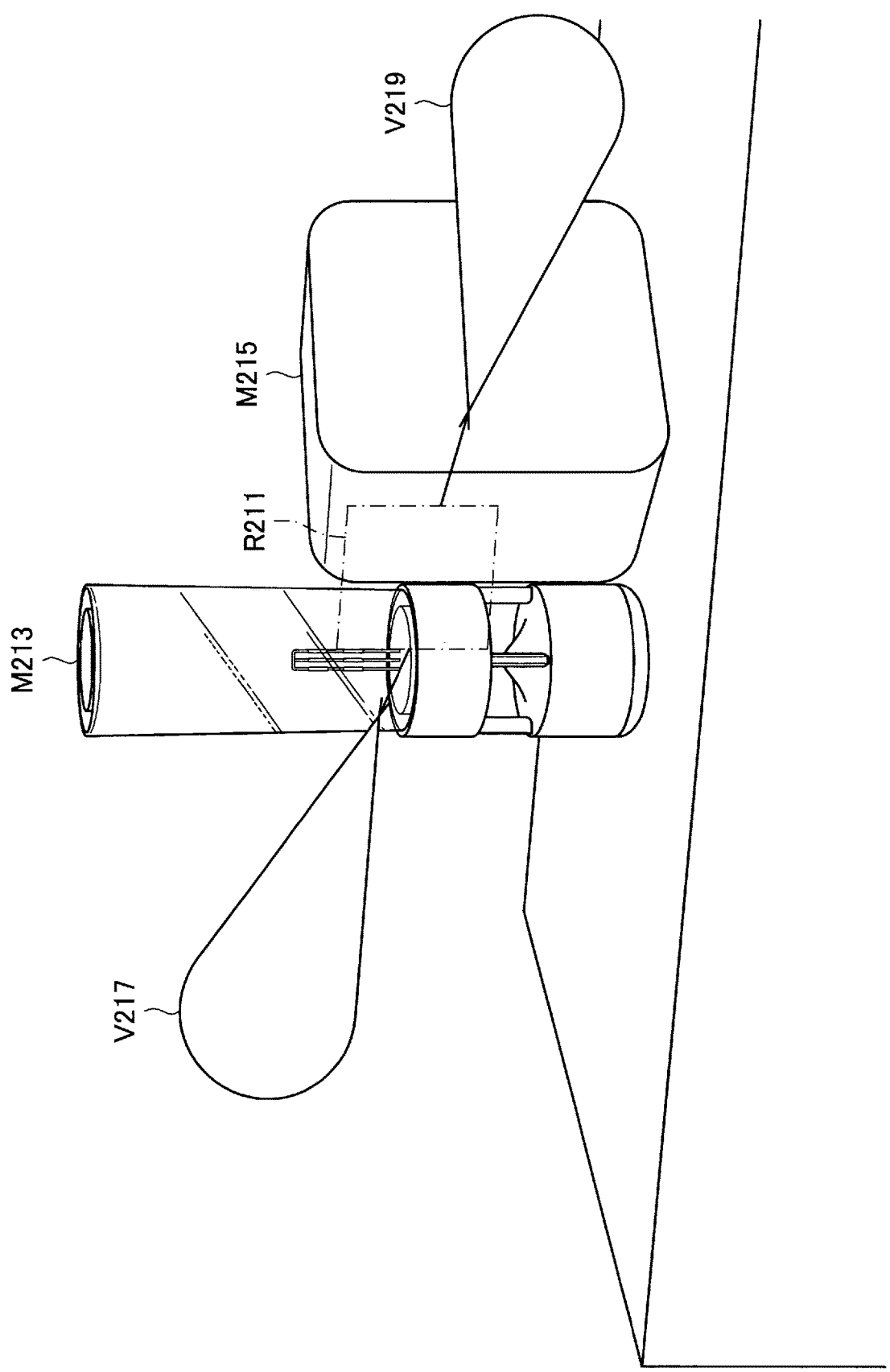
FIG. 14 is an explanatory diagram for describing another aspect of the information processing system according to a modification 5.

On the other hand, it is assumed that all of the candidates for a target to which the sight line is directed are "non-moving objects". For example, FIG. 14 is an explanatory diagram for describing another aspect of the information processing system according to the modification 5, and shows an example of a case in which the sight line is directed to real objects M213 and M215 installed to be positioned in the vicinity of each other. In FIG. 14, the reference numeral R211 schematically indicates an area in the real space to which the sight line of a user is directed. That is, in the example shown in FIG. 14, the information processing system 1 identifies the real objects M213 and M215 as the candidates for a target to which the sight line is directed.

As shown in FIG. 14, in a situation in which only a real object is identified as the candidate for a target to which the sight line is directed, it is not always possible to control the position of the real object. In this case, for example, the information processing system 1 may present display information which is an alternative of each real object, and control the display position of the display information. For example, in the example shown in FIG. 14, the information processing system 1 presents a virtual object V217 configured as an icon for designating the real object M213 in association with the real object M213 as display information which is an alternative of the real object M213. In the same manner, the information processing system 1 presents a virtual object V219 configured as an icon for designating the real object M215 in association with the real object M215 as display information which is an alternative of the real object M215. In addition, at this time, the information processing system 1 controls respective display positions of virtual objects V217 and V219 such that the virtual objects V217 and V219 are presented to be separated from each other.

Figure 15:
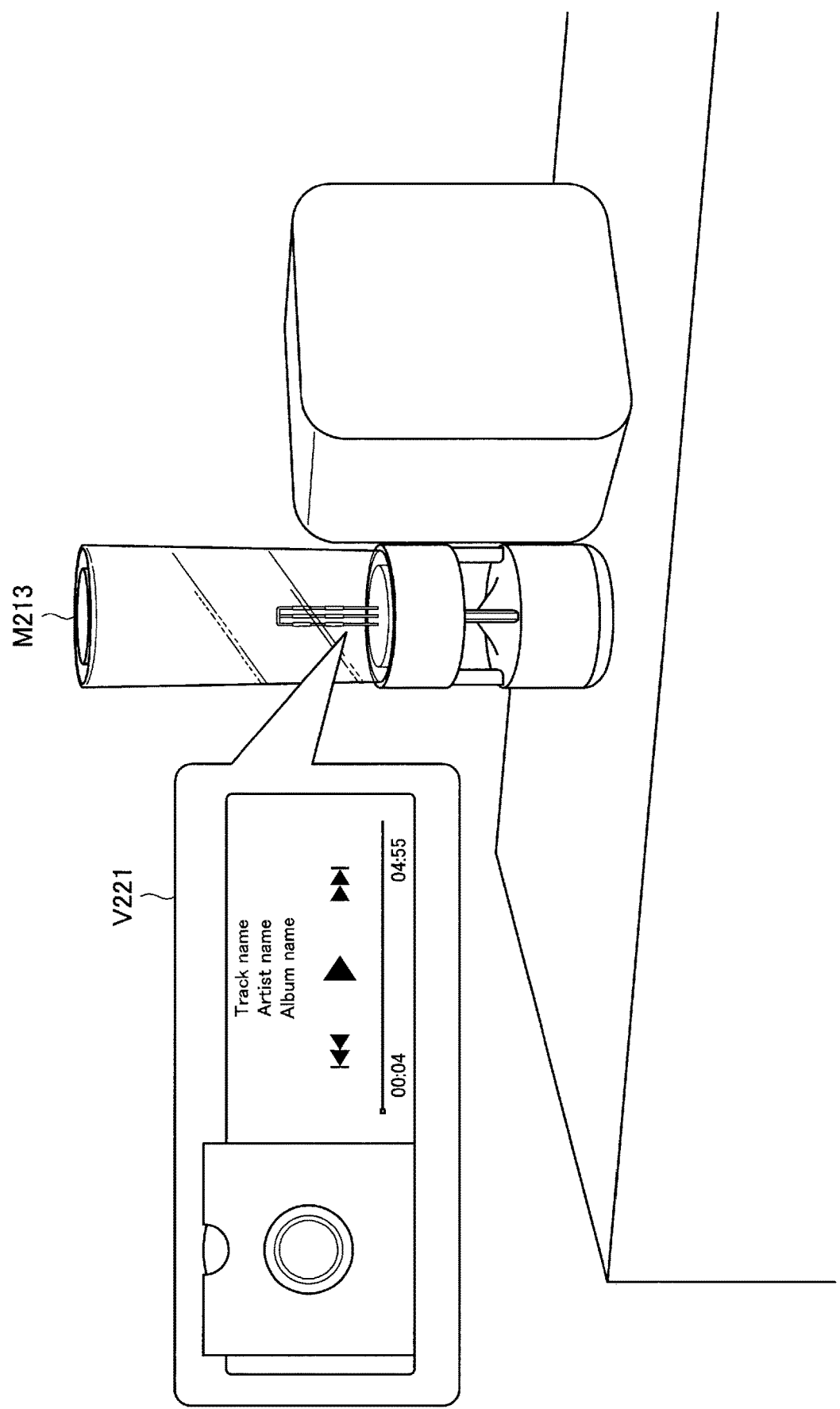
FIG. 15 is an explanatory diagram for describing another aspect of the information processing system according to a modification 5.

Note that the type of display information presented as an alternative of a real object is not particularly limited. For example, FIG. 15 is an explanatory diagram for describing another aspect of the information processing system according to the modification 5, and shows an example of display information presented as the alternative of a real object. Specifically, in the example shown in FIG. 15, the information processing system 1 presents a virtual object V221 configured as an operation menu for operating the real object M213 as display information which is an alternative of the real object M213 in association with the real object M213.

As described above, the example of control for guiding the sight line of a user in a more preferred has been described as the modification 5.

4.6. Modification 6: Example of Control in Accordance with Priority

Subsequently, an example of control for setting priority for a selection target in accordance with various states or situations (that is, weighting is performed), and realizing an interaction with a user in a more preferred manner using the priority will be described as a modification 6.

For example, the information processing system 1 may control a display of at least one of a plurality of pieces of display information in accordance with the priority set between the plurality of pieces of display information when the plurality of pieces of display information identified as the candidates for an operation target are caused to be separated from each other. Note that an example of a setting method of priority will be separately described below.

As a specific example, the information processing system 1 may cause a plurality of pieces of display information to be separated from each other by causing a piece of display information with high priority among the plurality of pieces of identified display information to be moved. In this manner, it is possible to quickly identify a target to which the sight line is originally directed by a user as an operation target by moving a target which is highly likely to be selected by the user (that is, a piece of display information with high priority) and dynamically guiding the sight line of the user. In addition, as another example, a plurality of pieces of display information may be caused to be separated from each other by causing a piece of display information with low priority among the plurality of pieces of identified display information to be moved. In this manner, it is possible to minimize movement of a sight line for selecting a target by moving a target which is less likely to be selected by a user (that is, a piece of display information with low priority). Note that whether to move either a piece of display information with high priority or the piece of display information with low priority may be appropriately changed in accordance with, for example, a use case or user scene.

Note that the setting method of priority is not particularly limited. For example, a target with higher usage frequency may be set to have higher priority. In addition, in a case in which a piece of display information is selected as the candidate for an operation target is a virtual object for communicating with another user (for example, an avatar, and the like), display information corresponding to a user with higher communication frequency may be set to have higher priority. Moreover, priority may be set in accordance with a relationship between users. For example, a piece of display information corresponding to a user set as a friend or family may be set to have higher priority than pieces of display information corresponding to the other users.

In addition, the priority setting may be dynamically set or changed in accordance with a history of a situation or past history. For example, the information processing system 1 may accumulate behaviors of a user in accordance with a time zone, place, situation, and the like as data on the basis of so-called machine learning, and set priority between a plurality of pieces of display information identified as the candidate for an operation target on the basis of the accumulated data. With such configuration, the information processing system 1 can set priority between a plurality of pieces of display information in accordance with a habit of a user or a tendency of the user selecting a target, and present a piece of display information with higher priority to be selected more easily by a user.

Figure 16:
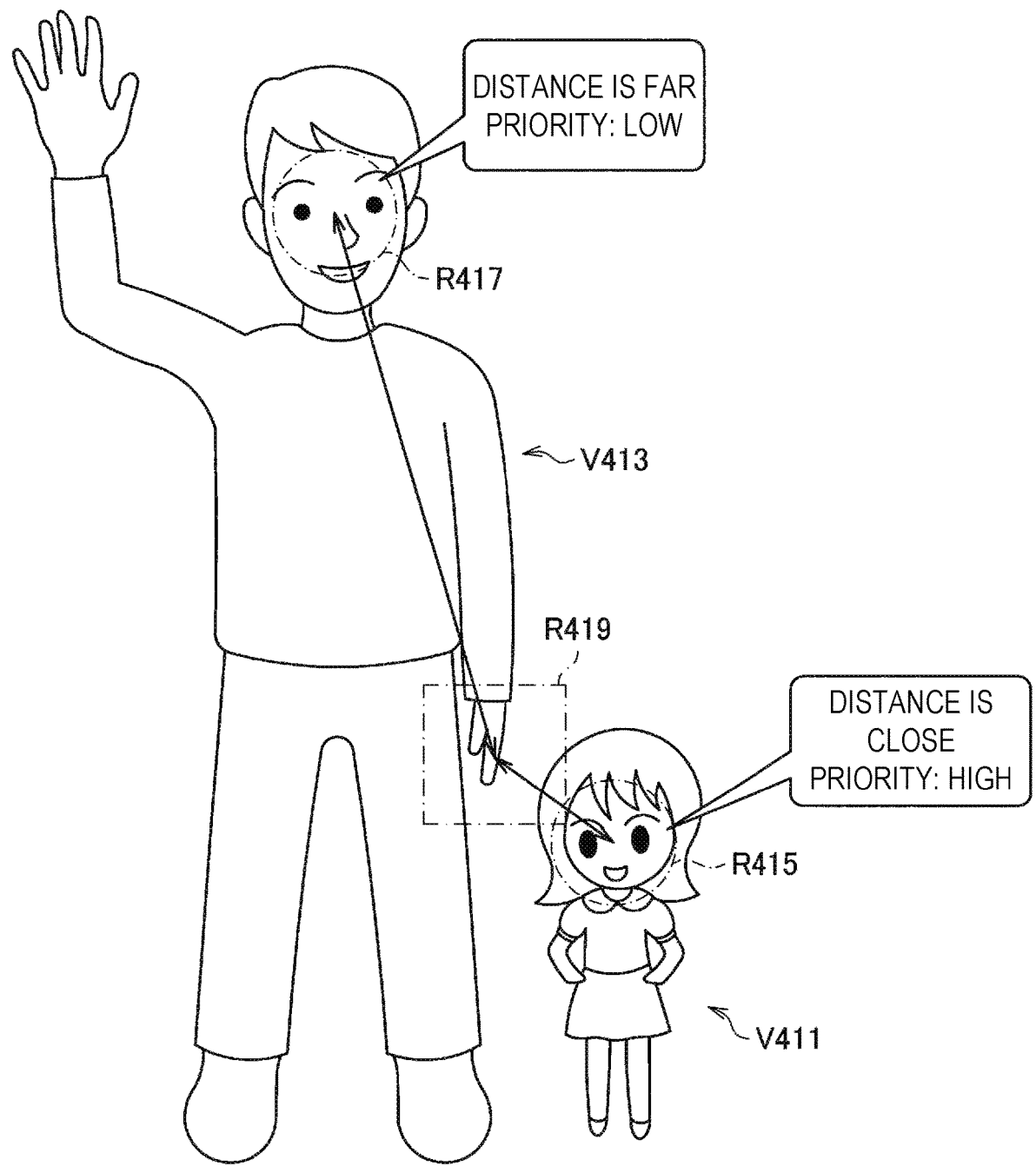
FIG. 16 is an explanatory diagram illustrating an overview of the information processing system according to Modification Example 6.

In addition, priority may be set between a plurality of pieces of display information identified as candidates for an operation target in accordance with a situation in which the candidates for an operation are identified. For example, FIG. 16 is an explanatory diagram for describing an overview of the information processing system according to the modification 6. In FIG. 16, a reference numeral R419 schematically indicates a position in the real space to which the sight line of a user is directed. That is, FIG. 16 shows a situation in which a user directs the sight line toward virtual objects V411 and V413, and in this case, the information processing system 1 identifies the virtual objects V411 and V413 as the candidates for an operation target.

At this time, the information processing system 1 may set priority between the virtual objects V411 and V413 in accordance with a distance between a position R416 to which the sight line is directed and each of the virtual objects V411 and V413 identified as the candidates. For example, a reference numeral R415 schematically indicates a position which is a reference of the virtual object V411 in a case in which the distance between the position R416 to which the sight line is directed and the virtual object V411 is measured (hereinafter, referred to as an "interaction point"). In the same manner, a reference numeral R417 indicates an interaction point of the virtual object V413.

In the example shown in FIG. 16, the interaction point R415 of the virtual object V411 is positioned closer to the position R416 to which the sight line is directed than the interaction point R417 of the virtual object 413. For this reason, the information processing system 1 sets the priority of the virtual object V411 to be higher than the priority of the virtual object V413.

Note that the interaction point may be set on the basis of a center or a center of gravity of each virtual object. In addition, as another example, the interaction point may be set to a position at which the sight line of a user is collected more easily among respective portions of a virtual object. For example, since the virtual objects V411 and V413 are presented as avatars imitating characters in the example shown in FIG. 16, an interaction point is set to a portion corresponding to a face of the character. In addition, a setting method of an interaction point may be dynamically set or changed in accordance with various states or situations.

Moreover, as another example, the information processing system 1 may exclude a pieces of display information with low priority among a plurality of pieces of display information identified as the candidates for an operation target from the candidates for an operation target. In this case, for example, the information processing system 1 may accumulate data of options not selected by a user in accordance with a time zone, place, situation, and the like on the basis of the machine learning, and set priority between the plurality of pieces of display information identified as the candidates for an operation target on the basis of the accumulated data. With such configuration, for example, the information processing system 1 can exclude a pieces of display information whose priority is lower than a threshold value (that is, a piece of display information which is less likely to be selected by a user) among the plurality of pieces of display information identified as candidates for an operation target from the candidates for an operation target.

For example, the information processing system 1 may exclude an option which is less likely to be selected in a time zone according to the time zone. Specifically, the information processing system 1 may exclude a piece of display information associated with an application such as game from the candidates for an operation target during business hours. In addition, as another example, the information processing system 1 may also exclude an option of the same type as an option selected immediately before. Specifically, the information processing system 1, immediately after a piece of display information associated with "restaurant" is selected, may recognize that other pieces of display information associated with "restaurant" are less likely to be selected likewise, and exclude the other pieces of display information from the candidates for an operation target.

As described above, the example of control for realizing an interaction with a user in a more preferred manner by setting priority for a selection target in accordance with various states or situations and using the priority has been described as the modification 6.

4.7. Modification 7: Example of Control in Accordance with State or Situation As described in some examples in the above description, the information processing system 1 according to the present embodiment may switch control in accordance with various states or situations. Therefore, another example of the control in accordance with various states or situations will be described below as a modification 7.

For example, the information processing system 1 may recognize a state or behavior of a user based on a detection result of various types of sensors, and control a display of a piece of display information in accordance with a recognition result when a plurality of pieces of display information identified as the candidates for an operation target are caused to be separated from each other.

As a specific example, the information processing system 1, in a case in which it is recognized that a user moves to a position in the real space on which a piece of display information identified as a candidate is superimposed, may perform control such that a movement velocity of the piece of display information becomes slower.

In addition, as another example, the information processing system 1 may control a timing of an interaction with a user in accordance with a recognition result of the state or behavior of the user. In this case, the information processing system 1 may control a timing at which a plurality of pieces of display information identified as the candidates for an operation target are caused to be moved or the operation of the piece of display information (for example, a movement velocity, and the like) such that an interaction is performed at a more preferable timing.

In addition, as another example, the information processing system 1 may predict an action to be performed next by a user, and control the motion of a piece of display information identified as the candidates for an operation target in accordance with a prediction result.

As a specific example, the information processing system 1, in a case in which it is predicted that a user communicates with another user via a virtual object configured as an avatar, may also cause the virtual object to be moved closer to the user. With such control, the information processing system 1 can guide a user to communication with another user via a selected target from an operation related to a selection of a target (virtual object) of communication in a more natural manner.

Moreover, as another example, a situation in which any one of a plurality of identified candidates is simply selected can be also assumed. In such a case, the information processing system 1 may control the display position of the display information such that a plurality of pieces of display information identified as the candidates for an operation target are simply separated from each other to the left or right. With such control, since the information processing system 1 can recognize a candidate to which a user originally directs the sight line as an operation target more quickly, it is possible to cause a speed of the interaction with a user to be improved.

Note that the method is not particularly limited as long as an action performed by a user next can be predicted. For example, the information processing system 1 may predict an action to be performed next by a user in accordance with a function being executed (for example, an application). Specifically, in a situation in which an application for communicating with another user is being executed, it is possible to predict that a user performs an action to talk to a virtual object such as an avatar.

In addition, as another example, the information processing system 1 may predicts an action to be performed by a user next in accordance with the attributes of a candidate for a selected operation target or processing associated with the candidate. Specifically, in a situation in which display information such as a menu or icon for changing various types of settings is selected as the candidate for an operation target, an action for communication is less likely to be performed on the display information, and an action for selecting the display information is highly likely to be performed. For this reason, for example, it is possible to predict that a user performs an action for explicitly selecting a piece of target display information such as a touch operation in accordance with attributes indicating a menu, icon, or the like for changing various types of settings. In addition, as another example, in a situation in which a virtual object such as an avatar is selected as the candidate for an operation target, an action for communication is highly likely to be performed on the virtual object. For this reason, for example, it is possible to predict that a user performs an action for communication such as speaking in accordance with attributes indicating the virtual object such as an avatar.

Of course, the example shown in the above description is merely an example, and the present disclosure is not necessarily limited to the example. In addition, it goes without saying that the information processing system 1 may predict an action to be performed next by a user by combining a plurality of conditions.

As described above, another example of control in accordance with various states or situations will be described as follows as the modification 7.

5. APPLICATION EXAMPLE

Subsequently, an application example of the information processing system 1 according to the present embodiment will be described.

Figure 17:
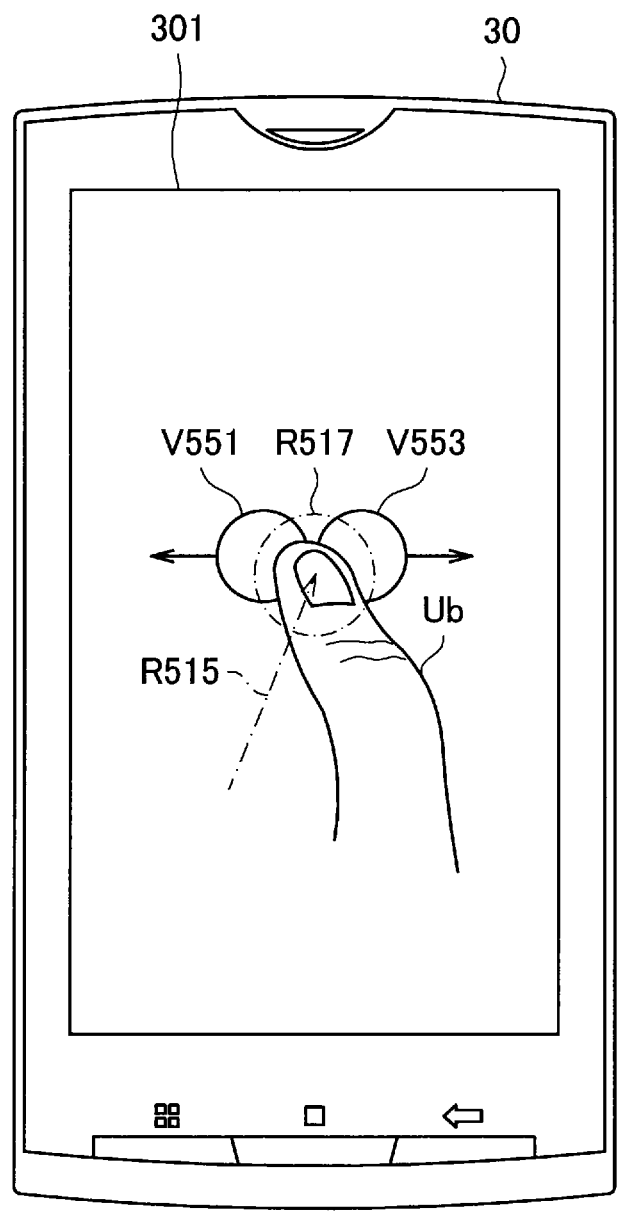
FIG. 17 is an explanatory diagram for describing a first application example of the information processing system according to the embodiment.

5.1. Application Example 1: Application Example to Smart Phone or Tablet Terminal First, an example of a case in which the information processing system according to the present embodiment is applied to an apparatus which performs a user's input using a touch operation for a piece of display information displayed on a screen, such as a so-called smart phone or tablet terminal, will be described with reference to FIG. 17 as an application example 1. FIG. 17 is an explanatory diagram for describing a first application example of the information processing system according to the present embodiment, and shows an example of a case in which an interaction with a user using the information processing system according to the present embodiment described above is applied to smart phones.

For example, FIG. 17 shows an example of a case in which an information processing device 30 is operated by performing a touch operation using an operating body Ub such as a finger on display information displayed on a display unit 301 of the information processing device 30 configured as a smart phone (for example, a display). In addition, FIG. 17 schematically shows a situation in which a user performs a touch operation using the operating body Ub on one of pieces of display information V551 and V553 displayed on the display unit 301 to be positioned in the vicinity of each other.

In the example shown in FIG. 17, the information processing device 30 identifies the pieces of display information V551 and V553 as the candidates for an operation target, and controls the display positions of the pieces of display information V551 and V553 such that the pieces of identified display information V551 and V553 are separated from each other.

Specifically, the information processing device 30 may identify the pieces of display information V551 and V553 as the candidates for an operation target by detecting an approach of the operating body Ub to positions presented by the pieces of display information V551 and V553 on the basis of a detection result of a touch panel provided on the screen of the display unit 303.

In addition, as another example, the information processing device 30 may detect the sight line of a user, thereby identifying the candidate for an operation target in accordance with a position on the screen of the display unit 303 indicated by the sight line. For example, in the example shown in FIG. 17, a sight line R515 of a user is directed to a position indicated by a reference numeral R517 on the screen of the display unit 303. In this case, the information processing device 30 may recognize that the sight line R515 is directed to the position R517 on the screen by detecting the sight line R515, and identify the pieces of display information V551 and V553 positioned in the vicinity of the position R517 as the candidates for an operation target.

Note that a method of detecting the sight line of a user is not particularly limited. As a specific example, an imaging unit for capturing an image of a user facing the screen of the display unit 301 may be provided on a surface of the information processing device 30 on which the display unit 301 is provided. With such a configuration, the information processing device 30 can detect the sight line R515 of a user by analyzing an image of the face of the user (eventually, an image of the eye of the user) captured by the imaging unit.

As described above, the example of a case in which the information processing system according to the present embodiment is applied to an apparatus which performs a user's input using a touch operation for a piece of display information displayed on a screen, such as a so-called smart phone or tablet terminal, has been described with reference to FIG. 17 as the application example 1.

5.2. Application Example 2: Application Example to Table Top System

Figure 18:
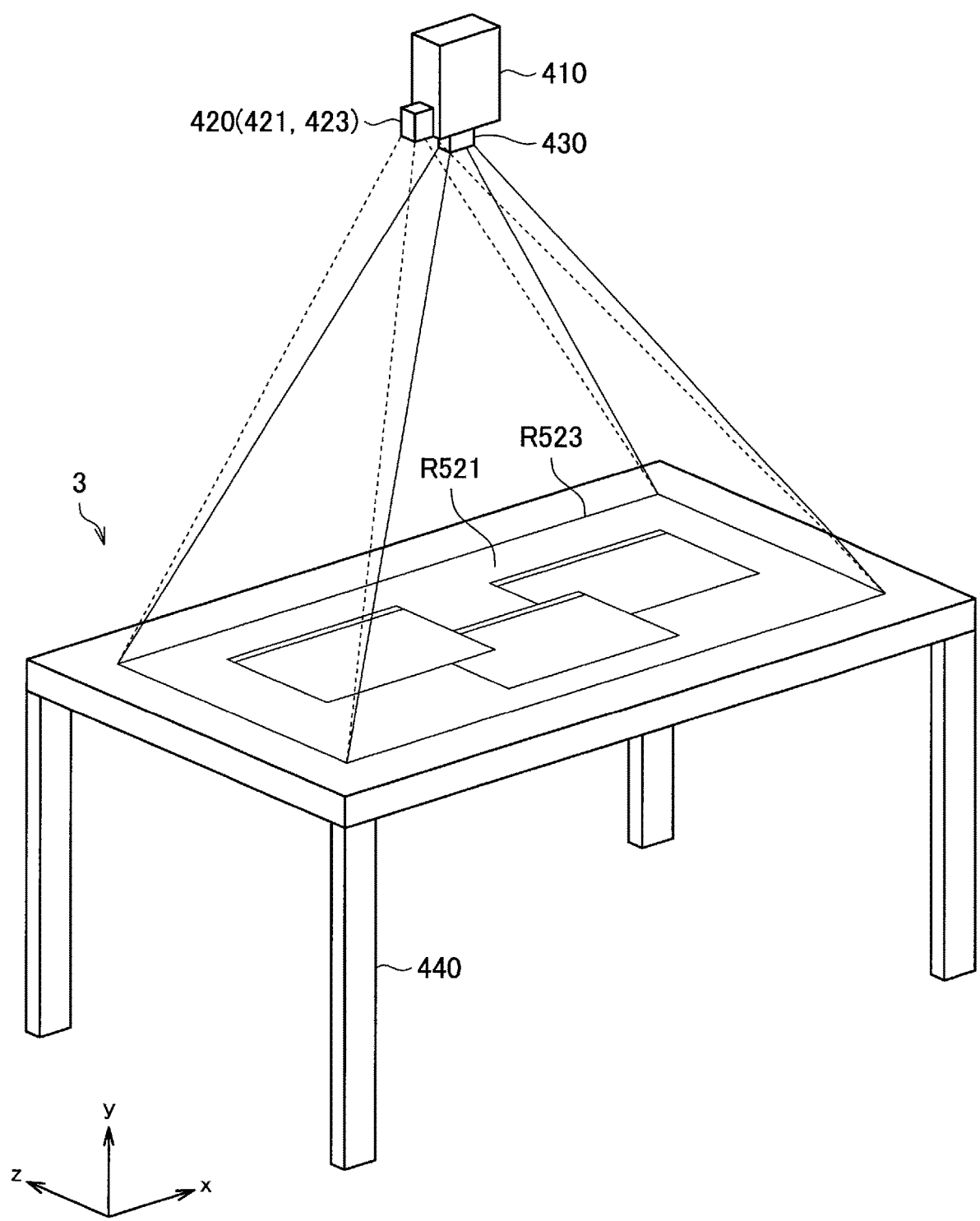
FIG. 18 is an explanatory diagram for describing a second application example of the information processing system according to the embodiment.
Figure 19:
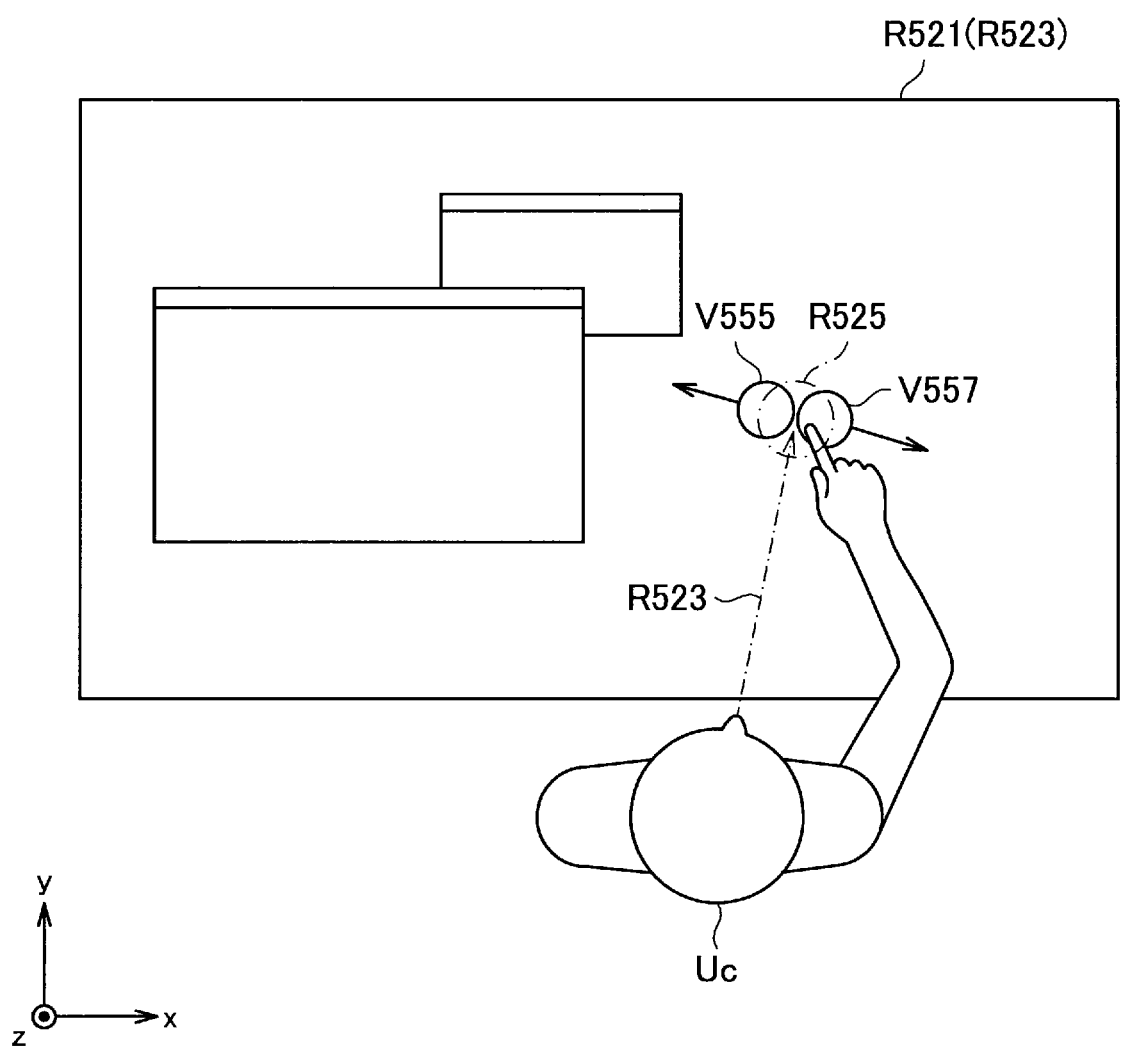
FIG. 19 is an explanatory diagram for describing a second application example of the information processing system according to the embodiment.

Subsequently, an example of a case in which the information processing system according to the present embodiment is applied to a so-called table top system with reference to FIGS. 18 and 19 will be described as application example 2. FIGS. 18 and 19 are explanatory diagrams for describing a second application example of the information processing system according to the present embodiment. Note that in the following description, the information processing system according to the application example 2 may be referred to as an "information processing system 3" to be distinguished from the information processing system 1 according to the embodiment described above.

First, an example of a schematic configuration of the information processing system 3 configured as a table top system will be described with reference to FIG. 18. As shown in FIG. 18, the information processing system 3 according to the application example 2 includes a sensor box 420, an output unit 430 for presenting display information, and a main body 410 in which a control unit for controlling various operations of the information processing system 3 is provided.

In the example shown in FIG. 18, the information processing system 3 is installed, for example, to face the top surface side of a table 440 above the table 440 and the like. The information processing system 3 projects display information on the output unit 430 with the top surface of the table 440 as a projection surface, thereby presenting the display information to a user and receiving an operation from a user using the information processing system 3 for the projected display information. Note that a reference numeral R521 indicates an area (that is, a projection surface) on which information (that is, display information) is projected by the output unit 430.

The sensor box 420 includes a detection unit 421 for recognizing an operation content of a user using the information processing system 3, or a shape, pattern, or the like of an object placed in the table 440. For example, in the example shown in FIG. 18, the detection unit 421 is installed such that a detection range is formed from above the table 440 to the top surface of the table 440. That is, the detection unit 421 is provided to be separated from the table 440 serving as a target on which information is displayed.

In addition, the sensor box 420 may include a sound collecting unit 423, like a so-called microphone, for sound collection of acoustic information such as voice uttered by a user or ambient sounds and the like of an environment in which the information processing system 3 is placed. Note that the sound collecting unit 423 can be constituted by, for example, a sound collecting device such as a so-called microphone.

The detection unit 421 can be constituted by, for example, a distance measuring sensor, and the like. In addition, as another example, the detection unit 421 may be constituted by a camera for imaging the table 440 using, for example, one imaging optical system (for example, a series of lens group) and a stereo camera capable of imaging the table 440 using a plurality of imaging optical systems and recording depth direction information. Note that in the present description, the detection unit 421 is described to be configured as a so-called stereo camera.

In a case in which a stereo camera is used as the detection unit 421, for example, a visible light camera, an infrared ray camera, or the like can be applied to the stereo camera. The detection unit 421 can acquire information indicating a distance from the detection unit 421 (hereinafter, referred to as "depth information") by using a stereo camera as the detection unit 421. The detection unit 421 acquires the depth information, and thereby the information processing system 3 can detect a real object such as a hand or an object placed on the table 440. In addition, the detection unit 421 acquires the depth information, and thereby the information processing system 3 can detect a contact and an approach of the operating body such as the hand of a user to the table 440 or a separation of the operating body from the table 440.

With such a configuration, the information processing system 3 can recognize an operation by a user using the operating body such as a hand with respect to display information projected on the area R521 on the top surface of the table 440, and execute various types of functions in accordance with content of the operation.

In addition, the information processing system 3 can recognize a position or direction of a part such as a hand or an arm which operates in the detection area R123 of the detection unit 421 to operate the display information projected on the area R521 on the basis of a detection result by the detection unit 421 described above.

Moreover, the information processing system 3 may also be configured to be able to detect the sight line of a user performing an operation on the display information projected on the area R521 on the top surface of the table 440. In this case, for example, an imaging unit for imaging a periphery of the table 440 may be provided in the information processing system 3. With such a configuration, the information processing system 3 analyzes an image captured by the imaging unit, thereby recognizing a position or posture of the head of a user positioned in the periphery of the table 440, and detecting the sight line of the user on the basis of a result of the recognition.

In addition, as another example, the information processing system 3 may be configured to be able to cooperate with the input/output device 20 according to the embodiment described above. In this case, the information processing system 3 may recognizes the position or posture of the head of a user wearing the input/output device 20 by analyzing the position or posture of the input/output device 20. Moreover, the information processing system 3 may detect the sight line of the user by analyzing the image of the eyeball of the user captured by the input/output device 20.

Subsequently, an example of the operation of the information processing system 3 according to the application example 2 will be described with reference to FIG. 19. FIG. 19 is an explanatory diagram for describing an overview of the information processing system 3 according to the application example 2, and shows an example of a positional relationship between the area R521 and a user in a case in which the top surface of the table 440 is looked down from the top in the vertical direction. In addition, FIG. 19 schematically shows a situation in which a user Uc performs a touch operation using the operating body such as his or her hand or finger on one of pieces of display information V555 and V557 projected on the area R521 to be positioned in the vicinity of each other.

In the example shown in FIG. 19, the information processing system 3 identifies the pieces of display information V555 and V557 as the candidates for an operation target, and controls positions on which the pieces of display information V555 and V557 are projected such that the pieces of identified display information V555 and V557 are separated from each other.

Specifically, the information processing system 3 may identify the pieces of display information V555 and V557 as the candidates for a operation target by detecting an approach of the hand or finger of the user Uc to the positions on which the pieces of display information V555 and V557 are projected in the area R521 on the top surface of the table 440.

In addition, as another example, the information processing system 3 may identify the candidate for an operation target in accordance with a position indicated by a sight line in the area R521 on the top surface of the table 440 by detecting the sight line of a user. For example, in the example shown in FIG. 19, the sight line R525 of a user is directed to a position indicated by a reference numeral R527 in the area R521 on the top surface of the table 440. In this case, the information processing system 3 may recognizes that the sight line R525 is directed to the position R527 in the area R521 by detecting the sight line R525, and identify the pieces of display information V555 and V557 positioned in the vicinity of the position R527 as the candidates for an operation target.

As described above, the example of a case in which the information processing system according to the present embodiment is applied to the table top system has been described with reference to FIGS. 18 and 19 as the application example 2.

5.3. Application Example 3: Example of Control in Case of Adopting Touch Operation Subsequently, an example of control of a case in which a user adopts a touch operation as an operation for inputting information as shown in the application examples 1 and 2 described above will be described with reference to FIGS. 20 and 21 as an application example 3.

Figure 20:
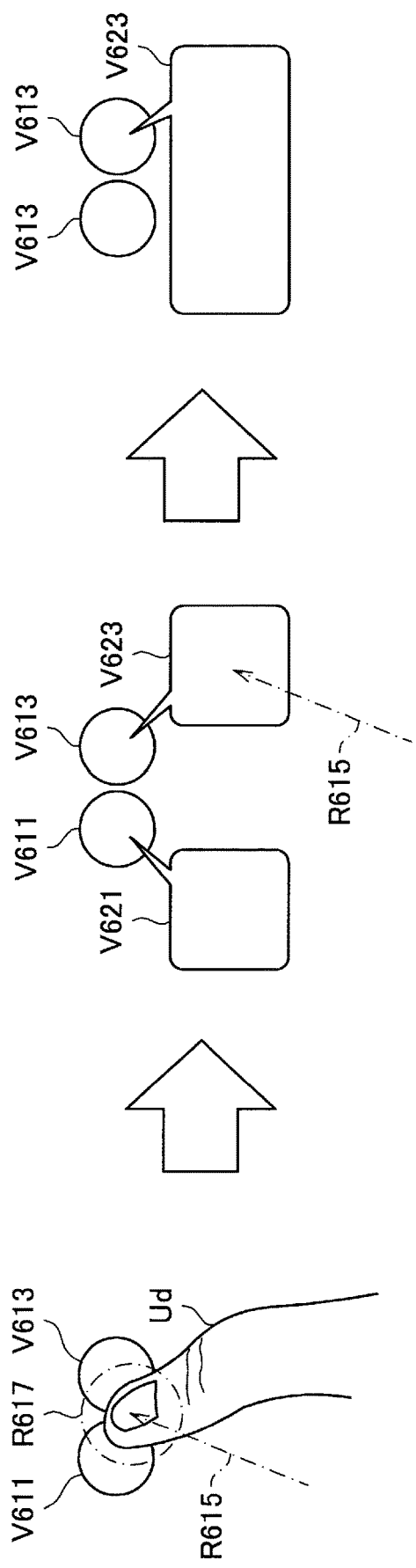
FIG. 20 is an explanatory diagram for describing a third application example of the information processing system according to the embodiment.

For example, FIG. 20 is an explanatory diagram for describing a third application example of the information processing system according to the present embodiment, and shows an example of an interaction in which both a designation of a target using a sight line and a touch operation for a target are used. First, a diagram on the left side of FIG. 20 schematically shows a situation in which a user performs a touch operation using an operating body Ud on one of objects V611 and V613 presented to be positioned in the vicinity of each other. A reference numeral R615 indicates the sight line of a user, and a reference numeral R617 indicates a position to which the sight line R615 is directed. That is, in a situation shown in the diagram on the left side of FIG. 20, the information processing system identifies the objects V611 and V613 as the candidates for an operation target to which the sight line R615 is directed.

Next, the information processing system presents pieces of display information V621 and V623 which are alternatives of the objects V611 and V613 identified as the candidates for an operation target in association with these objects as shown in a diagram at the center of FIG. 20. In addition, the information processing system guides the sight line R615 of a user by controlling positions at which the pieces of display information V621 and V623 are presented such that the pieces of display information V621 and V623 are separated from each other at this time. For example, the sight line R615 is guided to the piece of display information V623 associated with the object V613 to which a user originally directs the sight line R615 as an operation target in the diagram at the center of FIG. 20.

The sight line R615 is guided as shown in the diagram at the center of FIG. 20, and thereby the information processing system determines the piece of display information V623 to which the sight line R615 is guided as an operation target as shown in a diagram on the right side of FIG. 20. At this time, the information processing system may present the piece of display information V623 as shown in the diagram on the right side of FIG. 20, and restrict a display of the piece of display information V621 which is not selected as an operation target.

Figure 21:
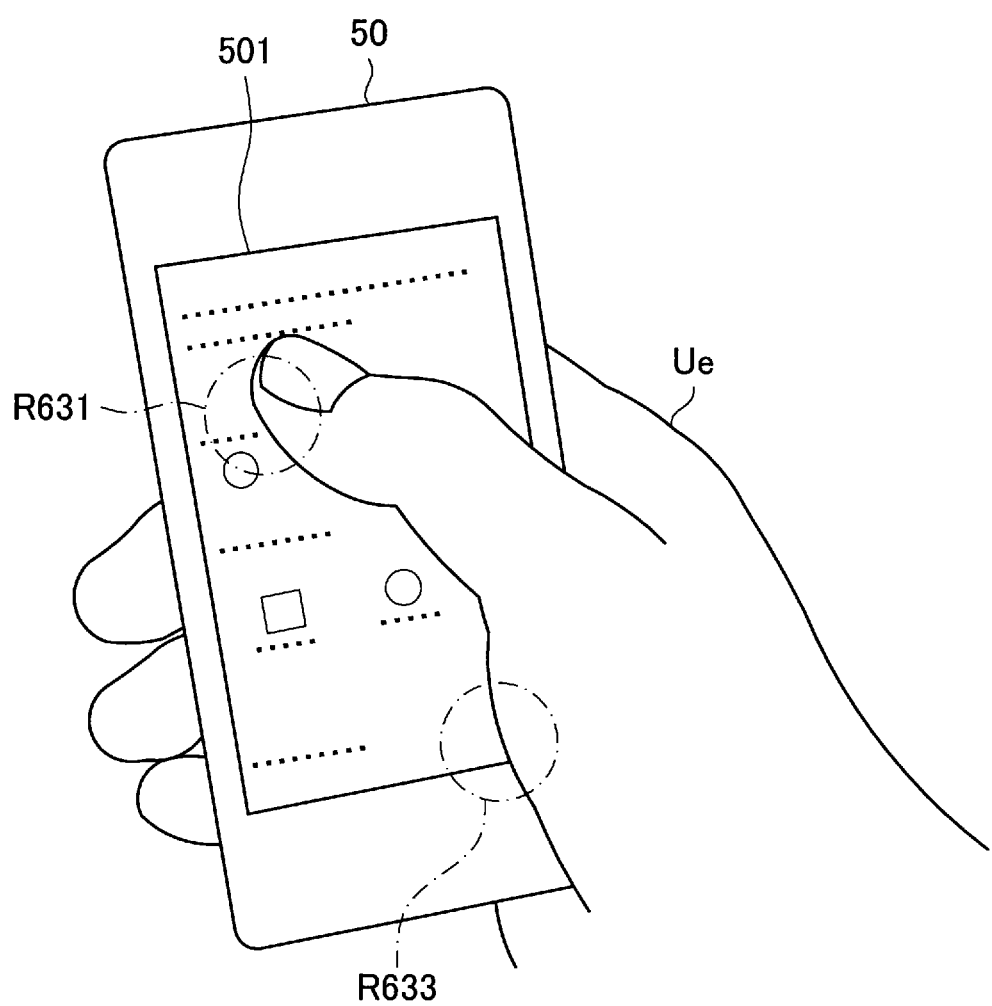
FIG. 21 is an explanatory diagram for describing another aspect of a third application example of the information processing system according to the embodiment.

In addition, FIG. 21 is an explanatory diagram for describing another aspect of the third application example of the information processing system according to the present embodiment, and shows an example of an interaction in which both a designation of a target using a sight line and a touch operation for a target are used. Specifically, FIG. 21 shows an example of a case in which the information processing device 50 is operated by performing a touch operation using an operating body Ue such as a finger on display information displaced on a display unit 501 (for example, a display) of the information processing device 50 configured as a smart phone.

In a situation as shown in FIG. 21, for example, when a user touches a screen with a finger, other parts of the hand of the user may touch the screen and the touch of the other parts to the screen may be erroneously recognized as a touch operation. In view of such a situation, the information processing system restricts an area to receive a touch operation and prevents the erroneous recognition described above by identifying an operation target using the sight line of a user in the example shown in FIG. 21.

Specifically, a reference numeral R631 schematically indicates a position to which the sight line of a user is directed on a screen of the display unit 501 in FIG. 21. In addition, a reference numeral R633 schematically indicates another position on the screen which is touched by other parts of a right hand Ue when a user performs a touch operation to the vicinity of the position R631 on the screen of the display unit 501 using the thumb of the right hand Ue.

Even in such a situation, in the example shown in FIG. 21, the information processing system receives a touch operation for an area in the vicinity of the position R631 to which the sight line is directed on the screen of the display unit 501, and restricts a touch operation for other areas. For this reason, in the example shown in FIG. 21, even if the position R633 on the screen of the display unit 501 is touched by a part of the right hand Ue of a user, the information processing system does not recognize this touch as a touch operation. That is, with such control, the information processing system can prevent occurrence of an erroneous operation caused by an unintended touch operation of a user.

As described above, the example of control of a case in which a user adopts a touch operation as an operation for inputting information as shown in the application examples 1 and 2 described above has been described with reference to FIGS. 20 and 21 as the application example 3.

5. HARDWARE CONFIGURATION

Next, like the information processing device 10 and the input/output device 20 described above, a hardware configuration of an information processing device 900 included in the information processing system 1 according to the present embodiment will be described in detail with reference to FIG. 22. FIG. 22 is a function block diagram illustrating an example of the hardware configuration of the information processing device 900 included in the information processing system 1 according to the present embodiment of the present disclosure.

The information processing device 900 included in the information processing system 1 according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the recognition unit 101, the sight line detection unit 103, the trigger detection unit 105, the target identification unit 107, the processing execution unit 109, and the display control unit 111 described above with reference to FIG. 6 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915. Note that the input unit 253 described above with reference to FIG. 6 can be realized by, for example, the output device 917.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal. Note that the output unit 211 described above with reference to FIG. 6 can be realized by, for example, the output device 917.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk an optical disc, a magneto-optical disk or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance. Note that the storage unit 151 described above with reference to FIG. 6 can be realized by, for example, at least one of the RAM 905 and the storage device 919.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing device 900 included in the information processing system 1 according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 22, for example, it naturally includes various configurations corresponding to the information processing device 900 included in the information processing system 1 according to the present embodiment.

Note that it is also possible to develop a computer program for realizing the respective functions of the information processing device 900 included in the information processing system 1 according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (for example, a plurality of servers or the like). Note that a single computer or a plurality of cooperating computers is also referred to as "computer system."

7. CONCLUSION

As described above, in the information processing system 1 according to the present embodiment, the information processing device 10 causes a predetermined output unit 211 to display one or more pieces of display information (for example, virtual objects), and detects an operation for a visually visible object (for example, a real object or virtual object). In addition, the information processing device 10 identifies the candidate for display information serving as a target of an operation in accordance with a detection result of the operation, and, when there are a plurality of identified candidates, controls a display position of at least one candidate such that the plurality of candidates are separated from each other. Based on such a configuration, the information processing system 1 according to the present embodiment guides an operation of a user to a piece of display information which the user originally designates as an operation target among a plurality of pieces of display information identified as the candidates for an operation target. As a result, the information processing system 1 can realize an interaction with a user in a more natural manner even in a situation in which an operation is performed selectively on a plurality of visibly presented targets.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a control unit configured to cause a predetermined output unit to display one or more pieces of display information;

a detection unit configured to detect an operation for a visible object; and an identification unit configured to identify a candidate for display information serving as a target of the operation in accordance with a detection result of the operation, in which, in a case in which there are a plurality of identified candidates, the control unit controls a display position of at least one candidate such that the plurality of candidates are separated from each other.

(2)

The information processing device according to (1), in which the control unit controls a display position of at least one candidate among the plurality of identified candidates on a basis of a predetermined condition for identifying the candidate.

(3)

The information processing device according to (1) or (2), in which the detection unit detects an operation based on a sight line of a user, and the identification unit identifies the candidate for the display information serving as a target of the operation in accordance with a position indicated by the detected sight line.

(4)

The information processing device according to (3), in which the control unit controls a display position of at least one candidate among the plurality of candidates such that the plurality of identified candidates are positioned in a predetermined direction with respect to the user.

(5)

The information processing device according to (3) or (4), in which the detection unit detects a first operation based on the sight line and a second operation different from the first operation, and the identification unit identifies the candidate for the display information serving as a target of the operation in accordance with a detection result of the first operation using a detection of the second operation as a trigger.

(6)

The information processing device according to any one of (1) to (5), including:

a prediction unit configured to predict an operation to be subsequently input, in which the control unit controls a display position of at least one candidate among the plurality of identified candidates in accordance with a prediction result of the operation.

(7)

The information processing device according to (6), in which the prediction unit predicts an operation to be subsequently input in accordance with processing associated with at least one candidate among the plurality of identified candidates.

(8)

The information processing device according to any one of (1) to (7), in which the control unit controls a display position of at least one candidate among the plurality of identified candidates in accordance with priorities set for the plurality of candidates.

(9)

The information processing device according to (8), in which the control unit excludes at least some candidates with lower priorities from the plurality of identified candidates.

(10)

The information processing device according to (8) or (9), in which the priorities are set in accordance with a positional relationship between a position designated by the operation and the object or the display information associated with the object.

(11)

The information processing device according to (8) or (9), in which the priorities are set in accordance with the object or a frequency of an operation with respect to the display information associated with the object.

(12)

The information processing device according to any one of (1) to (11), in which the object is a real object positioned in a real space, and the control unit causes the output unit to display the display information such that the display information is superimposed on the real object.

(13)

The information processing device according to (12), including:

a recognition unit configured to recognize the real object, in which the control unit controls a display position of at least one candidate among the plurality of identified candidates in accordance with a recognition result of the real object.

(14)

The information processing device according to any one of (1) to (13), in which the control unit controls a display of another candidate other than a target of the operation in accordance with the display position of the candidate identified as a target of the operation.

(15)

The information processing device according to (14), in which the control unit controls a display position of the other candidate in accordance with the display position of the candidate identified as a target of the operation.

(16)

The information processing device according to (14), in which the control unit restricts a display of the other candidate.

(17)

The information processing device according to any one of (1) to (16), in which the control unit controls a display position of at least one candidate among the plurality of identified candidates in accordance with an attribute set for the candidate.

(18)

The information processing device according to any one of (1) to (17), in which the control unit controls a display position of at least one candidate among the plurality of identified candidates in accordance with a state of a user.

(19)

An information processing method including:

by a computer system, causing a predetermined output unit to display one or more pieces of display information;

detecting an operation for a visible object;

identifying a candidate for display information serving as a target of the operation in accordance with a detection result of the operation; and controlling, in a case in which there are a plurality of identified candidates, a display position of at least one candidate such that the plurality of candidates are separated from each other.

(20)

A program which causes a computer system to cause a predetermined output unit to display one or more pieces of display information;

detect an operation for a visible object;

identify a candidate for display information serving as a target of the operation in accordance with a detection result of the operation; and control, in a case in which there are a plurality of identified candidates, a display position of at least one candidate such that the plurality of candidates are separated from each other.

REFERENCE SIGNS LIST

1 information processing system
10 information processing device
20 input/output device
101 recognition unit
103 sight line detection unit
105 trigger detection unit
107 target identification unit
109 processing execution unit
111 display control unit
151 storage unit
201 imaging unit
211 output unit
251 detection unit
253 input unit

The invention claimed is:

1. An information processing device comprising:
   a control unit configured to cause a predetermined output unit to display one or more pieces of display information;
   a detection unit configured to detect an operation for a visible object based on a sight line of a user; and
   an identification unit configured to identify a plurality of candidates for display information, each identified candidate for display information serving as a target of the operation in accordance with a detection result of the operation,
   wherein, when the plurality of identified candidates are located within a threshold distance of each other, the control unit controls a display position of at least one identified candidate of the plurality of identified candidates to be moved from an initial display position such that respective display positions of the plurality of identified candidates are further separated from each other by moving the at least one identified candidate in a direction other than a direction of the sight line of the user, and
   wherein the control unit, the detection unit, and the identification unit are each implemented via at least one processor.

2. The information processing device according to claim 1,
wherein the control unit controls the display position of the at least one identified candidate among the plurality of identified candidates on a basis of a predetermined condition for identifying the candidate.

3. The information processing device according to claim 1,
wherein the identification unit identifies each candidate for the display information serving as the target of the operation in accordance with a position indicated by the detected sight line.

4. The information processing device according to claim 3,
wherein the control unit controls the display position of the at least one identified candidate among the plurality of candidates such that the plurality of identified candidates are positioned in a predetermined direction with respect to the user.

5. The information processing device according to claim 3,
wherein the detection unit
detects a first operation based on the detected sight line, and
detects a second operation different from the first operation, and
the identification unit identifies each candidate for the display information serving as the target of the operation in accordance with a detection result of the first operation using a detection result of the second operation as a trigger.

6. The information processing device according to claim 1, further comprising:
a prediction unit configured to predict an operation to be subsequently input,
wherein the control unit controls the display position of the at least one identified candidate among the plurality of identified candidates in accordance with a prediction result of the operation, and
wherein the prediction unit is implemented via at least one processor.

7. The information processing device according to claim 6,
wherein the prediction unit predicts the operation to be subsequently input in accordance with processing associated with the at least one identified candidate among the plurality of identified candidates.

8. The information processing device according to claim 1,
wherein the control unit controls the display position of the at least one identified candidate among the plurality of identified candidates in accordance with priorities set for the plurality of identified candidates.

9. The information processing device according to claim 8,
wherein the control unit excludes one or more candidates with lower priorities from being identified among the plurality of identified candidates.

10. The information processing device according to claim 8,
wherein the priorities are set in accordance with a positional relationship between a position designated by the operation and the object or the display information associated with the object.

11. The information processing device according to claim 8,
wherein the priorities are set in accordance with the object or a frequency of an operation with respect to the display information associated with the object.

12. The information processing device according to claim 1,
wherein the object is a real object positioned in a real space, and
the control unit causes the output unit to display the display information such that the display information is superimposed on the real object.

13. The information processing device according to claim 12, further comprising:
a recognition unit configured to recognize the real object,
wherein the control unit controls the display position of the at least one identified candidate among the plurality of identified candidates in accordance with a recognition result of the real object, and
wherein the recognition unit is implemented via at least one processor.

14. The information processing device according to claim 1,
wherein the control unit controls a display of another candidate other than the plurality of identified candidates in accordance with the controlled display position of the at least one candidate identified as the target of the operation.

15. The information processing device according to claim 14,
wherein the control unit controls a display position of the other candidate in accordance with the controlled display position of each identified candidate of the plurality of identified candidates.

16. The information processing device according to claim 14,
wherein the control unit restricts the display of the other candidate.

17. The information processing device according to claim 1,
wherein the control unit controls the display position of the at least one identified candidate among the plurality of identified candidates in accordance with an attribute set for the at least one identified candidate.

18. The information processing device according to claim 1,
wherein the control unit controls the display position of the at least one identified candidate among the plurality of identified candidates in accordance with a state of a user.

19. The information processing device according to claim 1,
wherein, in the case in which the plurality of identified candidates are located within the threshold distance of each other, the control unit controls the respective display positions of at each identified candidate of the plurality of identified candidates to be moved such that the respective display positions of the plurality of identified candidates are further separated from each other.

20. An information processing method, implemented by a computer system, the method comprising:
causing a predetermined output unit to display one or more pieces of display information;
detecting an operation for a visible object based on a sight line of a user;

identifying a plurality of candidates for display information, each identified candidate for display information serving as a target of the operation in accordance with a detection result of the operation; and controlling, when the plurality of identified candidates are located within a threshold distance of each other, a display position of at least one identified candidate of the plurality of identified candidates to be moved from an initial display position such that respective display positions of the plurality of identified candidates are further separated from each other by moving the at least one identified candidate in a direction other than a direction of the sight line of the user.

21. A non-transitory computer-readable storage medium having embodied thereon a program, which when executed by a computer system causes the computer system to execute a method, the method comprising:

a predetermined output unit to display one or more pieces of display information;

detecting an operation for a visible object based on a sight line of a user;

identifying a plurality of candidates for display information, each identified candidate for display information serving as a target of the operation in accordance with a detection result of the operation; and controlling, when the plurality of identified candidates are located within a threshold distance of each other, a display position of at least one identified candidate of the plurality of identified candidates to be moved from an initial display position such that respective display positions of the plurality of identified candidates are further separated from each other by moving the at least one identified candidate in a direction other than a direction of the sight line of the user.

* * * * *